US010198205B1

(12) United States Patent
Freilich

(10) Patent No.: US 10,198,205 B1
(45) Date of Patent: Feb. 5, 2019

(54) DYNAMICALLY ADJUSTING A NUMBER OF STORAGE DEVICES UTILIZED TO SIMULTANEOUSLY SERVICE WRITE OPERATIONS

(71) Applicant: Pure Storage, Inc., Mountain View, CA (US)

(72) Inventor: Joshua Freilich, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 191 days.

(21) Appl. No.: 15/418,055

(22) Filed: Jan. 27, 2017

Related U.S. Application Data

(60) Provisional application No. 62/436,192, filed on Dec. 19, 2016.

(51) Int. Cl.
  *G06F 11/00* (2006.01)
  *G06F 3/06* (2006.01)

(52) U.S. Cl.
  CPC ............ *G06F 3/0634* (2013.01); *G06F 3/061* (2013.01); *G06F 3/0688* (2013.01)

(58) Field of Classification Search
  CPC ...... G06F 3/061; G06F 3/0619; G06F 3/0634; G06F 3/0689
  See application file for complete search history.

(56) References Cited

U.S. PATENT DOCUMENTS

| | | |
|---|---|---|
| 5,706,210 A | 1/1998 | Kumano et al. |
| 5,799,200 A | 8/1998 | Brant et al. |
| 5,933,598 A | 8/1999 | Scales et al. |
| 6,012,032 A | 1/2000 | Donovan et al. |
| 6,085,333 A | 7/2000 | Dekoning et al. |
| 6,643,641 B1 | 11/2003 | Snyder |
| 6,647,514 B1 | 11/2003 | Umberger et al. |

(Continued)

FOREIGN PATENT DOCUMENTS

| | | |
|---|---|---|
| EP | 0725324 A2 | 8/1996 |
| WO | WO 2012/087648 A1 | 6/2012 |

(Continued)

OTHER PUBLICATIONS

The International Search Report and the Written Opinion received from the International Searching Authority (ISA/EPO) for International Application No. PCT/US2016/036693, dated Aug. 29, 2016, 10 pages.

(Continued)

*Primary Examiner* — Michael Maskulinski
(74) *Attorney, Agent, or Firm* — Edward J. Lenart; Kennedy Lenart Spraggins LLP

(57) ABSTRACT

Dynamically adjusting a number of storage devices in a storage system that may be utilized to simultaneously service write operations, includes: limiting a number of storage devices within a failure domain that may be simultaneously servicing write operations to a number less than a number of storage devices that may be lost without resulting in a loss of data; determining that an event has occurred that requires additional write bandwidth; and responsive to determining that an event has occurred that requires additional write bandwidth, increasing the number of storage devices that may be simultaneously servicing write operations.

20 Claims, 19 Drawing Sheets

(56) References Cited

U.S. PATENT DOCUMENTS

| | | |
|---|---|---|
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,191,207 B2 * | 3/2007 | Blount .................. G06F 3/0613 370/208 |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,124,569 B2 | 9/2015 | Hussain et al. |
| 9,128,910 B1 * | 9/2015 | Dayal .................. G06F 11/22 |
| 9,134,922 B2 | 9/2015 | Rajagopal et al. |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,444,822 B1 | 9/2016 | Borowiec et al. |
| 9,507,532 B1 | 11/2016 | Colgrove et al. |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Vana Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0084507 A1 * | 4/2012 | Colgrove ............ G06F 11/1076 711/114 |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0378888 A1 | 12/2015 | Zhang et al. |
| 2016/0092326 A1 * | 3/2016 | Wu .................. G06F 11/1076 714/6.3 |
| 2016/0098323 A1 | 4/2016 | Mutha et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |

(56) References Cited

U.S. PATENT DOCUMENTS

2017/0123654 A1* 5/2017 Standing ................. G06F 3/061
2017/0249089 A1* 8/2017 Han ...................... G06F 11/008

FOREIGN PATENT DOCUMENTS

| WO | WO 2013071087 A1 | 5/2013 |
|---|---|---|
| WO | WO 2014/110137 A1 | 7/2014 |
| WO | WO 2016/015008 A1 | 12/2016 |
| WO | WO 2016/190938 A1 | 12/2016 |
| WO | WO 2016/195759 A1 | 12/2016 |
| WO | WO 2016/195958 A1 | 12/2016 |
| WO | WO 2016/195961 A1 | 12/2016 |

OTHER PUBLICATIONS

The International Search Report and the Written Opinion received from the International Searching Authority (ISA/EP) for International Application No. PCT/US2016/038758, dated Oct. 7, 2016, 10 pages.

The International Search Report and the Written Opinion received from the International Searching Authority (ISA/EP) for International Application No. PCT/US2016/040393, dated Sep. 22, 2016, 10 pages.

The International Search Report and the Written Opinion received from the International Searching Authority (ISA/EP) for International Application No. PCT/US2016/044020, dated Sep. 30, 2016, 11 pages.

Kwok Kong, *Using PCI Express as the Primary System Interconnect in Multiroot Compute, Storage, Communications and Embedded Systems*, IDT, White Paper, <http://www.idt.com/document/whp/idt-pcie-multi-root-white-paper>, retrieved by WIPO Dec. 4, 2014, dated Aug. 28, 2008, 12 pages.

The International Search Report and the Written Opinion received from the International Searching Authority (ISA/EP) for International Application No. PCT/US2016/044874, dated Oct. 7, 2016, 11 pages.

The International Search Report and the Written Opinion received from the International Searching Authority (ISA/EP) for International Application No. PCT/US2016/044875, dated Oct. 5, 2016, 13 pages.

The International Search Report and the Written Opinion received from the International Searching Authority (ISA/EP) for International Application No. PCT/US2016/044876, dated Oct. 21, 2016, 12 pages.

The International Search Report and the Written Opinion received from the International Searching Authority (ISA/EP) for International Application No. PCT/US2016/044877, dated Sep. 29, 2016, 13 pages.

Xiao-Yu Hu et al., *Container Marking: Combining Data Placement, Garbage Collection and Wear Levelling for Flash*, 19th Annual IEEE International Symposium on Modelling, Analysis, and Simulation of Computer and Telecommunications Systems, ISBN: 978-0-7695-4430-4, DOI: 10.1109/MASCOTS.2011.50, dated Jul. 25-27, 2011, 11 pages.

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

PCMag. "Storage Array Definition". Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia. "What is a disk array". Published Jan. 13, 2012. <http://web.archive.org/web/20120113053358/http://www.techopedia.com/definition/1009/disk-array>, 1 page.

Webopedia. "What is a disk array". Published May 26, 2011. <http://web/archive.org/web/20110526081214/http://www.webopedia.com/TERM/D/disk_array.html>, 2 pages.

Li et al., *Access Control for the Services Oriented Architecture*, Proceedings of the 2007 ACM Workshop on Secure Web Services (SWS '07), Nov. 2007, pp. 9-17, ACM New York, NY.

The International Search Report and the Written Opinion received from the International Searching Authority (ISA/EPO) for International Application No. PCT/US2016/015006, dated Apr. 29, 2016, 12 pages.

The International Search Report and the Written Opinion received from the International Searching Authority (ISA/EPO) for International Application No. PCT/US2016/015008, dated May 4, 2016, 12 pages.

C. Hota et al., *Capability-based Cryptographic Data Access Control in Cloud Computing*, Int. J. Advanced Networking and Applications, col. 1, Issue 1, dated Aug. 2011, 10 pages.

The International Search Report and the Written Opinion received from the International Searching Authority (ISA/EPO) for International Application No. PCT/US2016/020410, dated Jul. 8, 2016, 17 pages.

The International Search Report and the Written Opinion received from the International Searching Authority (ISA/EPO) for International Application No. PCT/US2016/032084, dated Jul. 18, 2016, 12 pages.

Faith, "dictzip file format", GitHub.com (online). [Accessed Jul. 28, 2015], 1 page, URL: https://github.com/fidlej/idzip.

Wikipedia, "Convergent Encryption", Wikipedia.org (online), accessed Sep. 8, 2015, 2 pages, URL: en.wikipedia.org/wiki/Convergent_encryption.

Storer et al., "Secure Data Deduplication", Proceedings of the 4th ACM International Workshop on Storage Security and Survivability (StorageSS'08), Oct. 2008, 10 pages, ACM New York, NY. USA. DOI: 10.1145/1456469.1456471.

The International Search Report and the Written Opinion received from the International Searching Authority (ISA/EPO) for International Application No. PCT/US2016/016333, dated Jun. 8, 2016, 12 pages.

Etsi, *Network Function Virtualisation (NFV); Resiliency Requirements*, Etsi GS NFCV-REL 001, V1.1.1, http://www.etsi.org/deliver/etsi_gs/NFV-REL/001_099/001/01.01.01_60/gs_NFV-REL001v010101p.pdf (online), dated Jan. 2015, 82 pages.

The International Search Report and the Written Opinion received from the International Searching Authority (ISA/EPO) for International Application No. PCT/US2016/032052, dated Aug. 30, 2016, 17 pages.

Microsoft, "Hybrid for SharePoint Server 2013—Security Reference Architecture", <http://hybrid.office.com/img/Security_Reference Architecture.pdf> (online), dated Oct. 2014, 53 pages.

Microsoft, "Hybrid Identity", <http://aka.ms/HybridIdentityWp> (online), dated Apr. 2014, 36 pages.

Microsoft, "Hybrid Identity Management", <http://download.microsoft.com/download/E/A/E/EAE57CD1-A80B-423C-96BB-142FAAC630139/Hybrid_Identity_Datasheet.pdf> (online), published Apr. 2014, 17 pages.

Jacob Bellamy-Mcintyre et al., "OpenID and the Enterprise: A Model-based Analysis of Single Sign-On Authentication", 2011 15th IEEE International Enterprise Distributed Object Computing Conference (EDOC), DOI: 10.1109/EDOC.2011.26, ISBN: 978-1-4577-0362-1, <https://www.cs.auckland.ac.nz/~lutteroth/publications/McIntyreLutterothWeber2011-OpenID.pdf> (online), dated Aug. 29, 2011, 10 pages.

The International Search Report and the Written Opinion received from the International Searching Authority (ISA/EPO) for International Application No. PCT/US2016/035492, dated Aug. 17, 2016, 10 pages.

* cited by examiner

DYNAMICALLY ADJUSTING A NUMBER OF STORAGE DEVICES UTILIZED TO SIMULTANEOUSLY SERVICE WRITE OPERATIONS

CROSS-REFERENCE TO RELATED APPLICATION

This application is a non-provisional application for patent entitled to a filing date and claiming the benefit of earlier-filed U.S. Provisional Patent Application Ser. No. 62/436,192, filed on Dec. 19, 2016.

DESCRIPTION OF EMBODIMENTS

Figure 1:
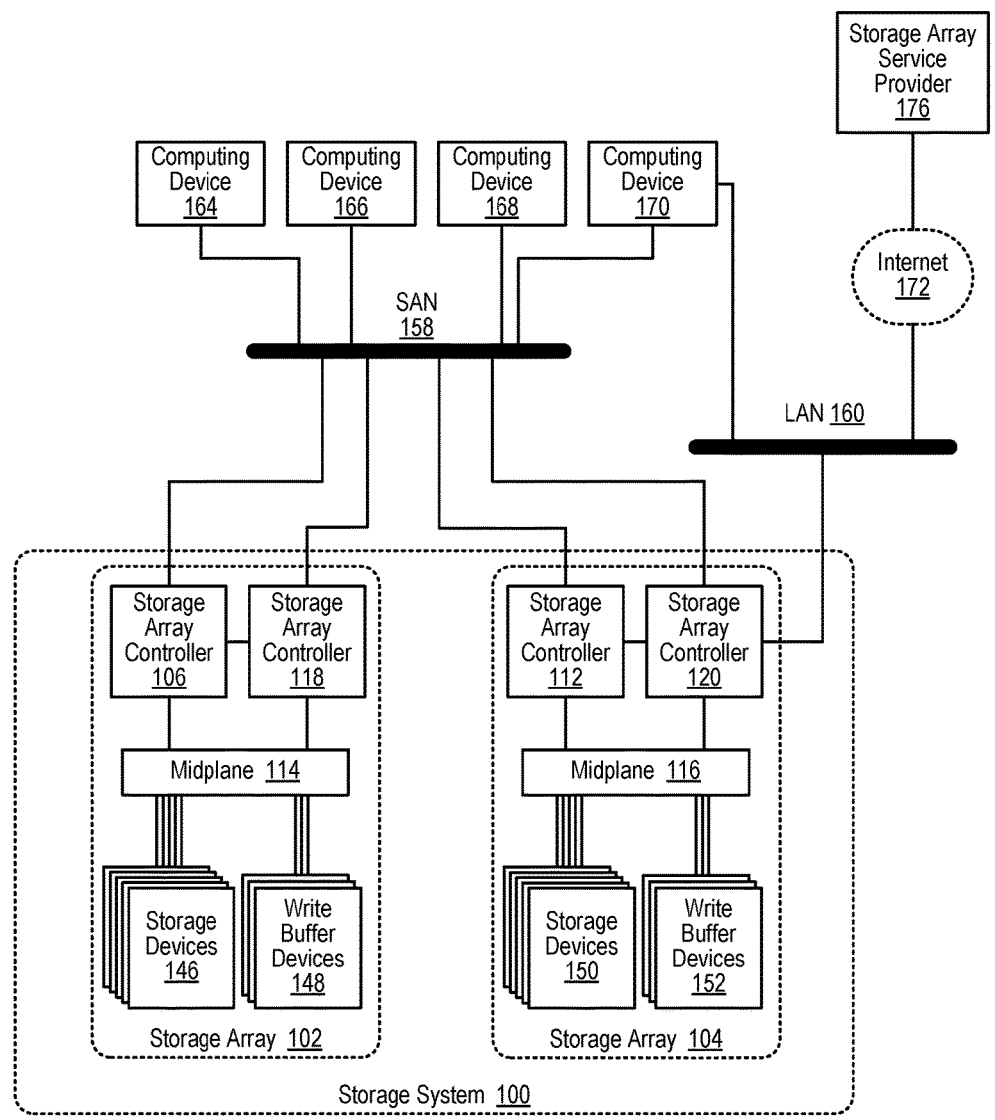
FIG. 1 sets forth a block diagram of a storage system configured for dynamically adjusting a number of storage devices that may be utilized to simultaneously service write operations according to some embodiments of the present disclosure.

Example methods, apparatus, and products for dynamically adjusting a number of storage devices that may be utilized to simultaneously service write operations in accordance with the present disclosure are described with reference to the accompanying drawings, beginning with FIG. 1. FIG. 1 sets forth a block diagram of a storage system (100) configured for dynamically adjusting a number of storage devices that may be utilized to simultaneously service write operations according to some embodiments of the present disclosure.

The storage system (100) depicted in FIG. 1 includes a plurality of storage arrays (102, 104), although dynamically adjusting a number of storage devices that may be utilized to simultaneously service write operations in accordance with embodiments of the present disclosure may be carried out in storage systems that include only a single storage array. Each storage array (102, 104) may be embodied as a collection of computer hardware devices that provide persistent data storage to users of the storage system (100). Each storage array (102, 104) may include a collection of data storage devices that are mounted within one or more chassis, racks, or other enclosure. Although not expressly depicted in FIG. 1, each storage array (102, 104) may include a plurality of power supplies that deliver power to one or more components within the storage system (100) via a power bus, each storage array (102, 104) may include a plurality of data communications networks that enables one or more components within the storage system (100) to communicates, each storage array (102, 104) may include a plurality of cooling components that are used to cool one or more components within the storage system (100), and so on.

The example storage arrays (102, 104) depicted in FIG. 1 may provide persistent data storage for computing devices (164, 166, 168, 170) that are coupled to the storage system (100) via one or more data communications networks. Each of the computing devices (164, 166, 168, 170) depicted in FIG. 1 may be embodied, for example, as a server, a workstation, a personal computer, a notebook, a smartphone, a tablet computer, or the like. The computing devices (164, 166, 168, 170) in the example of FIG. 1 are coupled for data communications to the storage arrays (102, 104) through a storage area network ('SAN') (158). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, small computer system interface ('SCSI'), iSCSI, HyperSCSI, and others. Readers will appreciate that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The computing devices (164, 166, 168, 170) depicted in FIG. 1 are also coupled for data communications to the storage arrays (102, 104) through a local area network (160) ('LAN'). The LAN (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Real Time Protocol ('RTP') and others as will occur to those of skill in the art. The LAN (160) depicted in FIG. 1 may be coupled to other computing devices not illustrated in FIG. 1, for example, via the Internet (172). Although only one storage array (104) is expressly depicted as being coupled to the computing devices (164, 166, 168, 170) via the LAN (160), readers will appreciate that other storage arrays (102) in the storage system (100) may also be coupled to the computing devices (164, 166, 168, 170) via the same LAN (160) or via a different LAN.

In addition to being coupled to the computing devices through the SAN (158) and the LAN (160), the storage arrays may also be coupled to one or more cloud service providers, for example, through the Internet (172) or through another data communications network. One example cloud service in FIG. 1 is a storage array services provider (176). The storage array service provider (176) may be configured to provide various storage array services such as reporting of storage array performance characteristics, configuration control of the storage arrays, analyzing log data generated by a storage system, and the like. The storage array services provider may rely on modules executing on the storage array itself to gather such data.

Each storage array (102, 104) depicted in FIG. 1 includes a plurality of storage array controllers (106, 112, 118, 120). Each storage array controller (106, 112, 118, 120) may be embodied as a module of automated computing machinery comprising computer hardware, computer software, or a combination of computer hardware and software. Each storage array controller (106, 112, 118, 120) may be configured to carry out various storage-related tasks such as, for example, writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112, 118, 120) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112, 118, 120) may include, for example, a data communications adapter configured to support communications via the SAN (158) and the LAN (160). Although only one of the storage array controllers (120) in the example of FIG. 1 is depicted as being coupled to the LAN (160) for data communications, readers will appreciate that each storage array controller (106, 112, 118, 120) may be independently coupled to the LAN (160). Each storage array controller (106, 112, 118, 120) may also include, for example, an I/O controller or the like that couples the storage array controller (106, 112, 118, 120) for data communications, through a midplane (114, 116), to a number of storage devices (146, 150), and a number of write buffer devices (148, 152) that are utilized as write caches.

In the example depicted in FIG. 1, the presence of multiple storage array controllers (106, 112, 118, 120) in each storage array (102, 104) can enable each storage array (102, 104) to be highly available as there are independent, redundant storage array controllers (106, 112, 118, 120) that are capable of servicing access requests (e.g., reads, writes) to the storage arrays (102, 104). In some embodiments, each storage array controller (106, 112, 118, 120) in a particular storage array (102, 104) may appear to be active to the computing devices (164, 166, 168, 170) as each storage array controller (106, 112, 118, 120) may be available for receiving requests to access the storage array (102, 104) from the computing devices (164, 166, 168, 170) via the SAN (158) or LAN (160). Although storage array controller (106, 112, 118, 120) may be available for receiving requests to access the storage array (102, 104), however, in some embodiments only one storage array controller (106, 112, 118, 120) may actively be allowed to direct access requests to the storage devices (146, 150) or write buffer devices (148, 152). For ease of explanation, a storage array controller that is allowed to direct access requests to the storage devices (146, 150) or write buffer devices (148, 152) may be referred to herein as an 'active' storage array controller whereas a storage array controller that is not allowed to direct access requests to the storage devices (146, 150) or write buffer devices (148, 152) may be referred to herein as a 'passive' storage array controller. Readers will appreciate that because a passive storage array controller may still receive requests to access the storage array (102, 104) from the computing devices (164, 166, 168, 170) via the SAN (158) or LAN (160), the passive storage array controller may be configured to forward any access requests received by the passive storage array controller to the active storage array controller.

Consider an example in which a first storage array controller (106) in a first storage array (102) is the active storage array controller that is allowed to direct access requests to the storage devices (146) or write buffer devices (148) within the first storage array (102), while a second storage array controller (118) in the first storage array (102) is the passive storage array controller that is not allowed to direct access requests to the storage devices (146) or write buffer devices (148) within the first storage array (102). In such an example, the second storage array controller (118) may continue to receive access requests from the computing devices (164, 166, 168, 170) via the SAN (158) or LAN (160). Upon receiving access requests from the computing devices (164, 166, 168, 170), the second storage array controller (118) may be configured to forward such access requests to the first storage array controller (106) via a communications link between the first storage array controller (106) and the second storage array controller (118). Readers will appreciate that such an embodiment may reduce the amount of coordination that must occur between the first storage array controller (106) and the second storage array controller (118) relative to an embodiment where both storage array controllers (106, 118) are allowed to simultaneously modify the contents of the storage devices (146) or write buffer devices (148).

Although the example described above refers to an embodiment where the first storage array controller (106) is the active storage array controller while the second storage array controller (118) is the passive storage array controller, over time such designations may switch back and forth. For example, an expected or unexpected event may occur that results in a situation where the first storage array controller (106) is the passive storage array controller while the second storage array controller (118) is the active storage array controller. An example of an unexpected event that could cause a change in the roles of each storage array controller (106, 118) is the occurrence of a failure or error condition with the first storage array controller (106) that causes the storage array (102) to fail over to the second storage array controller (118). An example of an expected event that could cause a change in the roles of each storage array controller (106, 118) is the expiration of a predetermined period of time, as the first storage array controller (106) may be responsible for interacting with the storage devices (146) and the write buffer devices (148) during a first time period while the second storage array controller (118) may be responsible for interacting with the storage devices (146) and the write buffer devices (148) during a second time period. Readers will appreciate that although the preceding paragraphs describe active and passive storage array controllers with reference to the first storage array (102), the storage array controllers (112, 120) that are part of other storage arrays (104) in the storage system (100) may operate in a similar manner.

Each storage array (102, 104) depicted in FIG. 1 includes one or more write buffer devices (148, 152). Each write buffer device (148, 152) may be configured to receive, from the one of the storage array controller (106, 112, 118, 120), data to be stored in one or more of the storage devices (146, 150). In the example of FIG. 1, writing data to the write buffer device (148, 152) may be carried out more quickly than writing data to the storage device (146, 150). The storage array controllers (106, 112, 118, 120) may therefore be configured to effectively utilize the write buffer devices (148, 152) as a quickly accessible buffer for data destined to be written to one or the storage devices (146, 150). By utilizing the write buffer devices (148, 152) in such a way, the write latency experienced by users of the storage system (100) may be significantly improved relative to storage systems that do not include such write buffer devices (148, 152). The write latency experienced by users of the storage system (100) may be significantly improved relative to storage systems that do not include such write buffer devices (148, 152) because the storage array controllers (106, 112, 118, 120) may send an acknowledgment to the user of the storage system (100) indicating that a write request has been serviced once the data associated with the write request has been written to one or the write buffer devices (148, 152), even if the data associated with the write request has not yet been written to any of the storage devices (146, 150).

The presence of the write buffer devices (148, 152) may also improve the utilization of the storage devices (146, 150) as a storage array controller (106, 112, 118, 120) can accumulate more writes and organize writing to the storage devices (146, 150) for greater efficiency. Greater efficiency can be achieved, for example, as the storage array controller (106, 112, 118, 120) may have more time to perform deeper compression of the data, the storage array controller (106, 112, 118, 120) may be able to organize the data into write blocks that are in better alignment with the underlying physical storage on the storage devices (146, 150), the storage array controller (106, 112, 118, 120) may be able to perform deduplication operations on the data, and so on. Such write buffer devices (148, 152) effectively convert storage arrays of solid-state drives (e.g., "Flash drives") from latency limited devices to throughput limited devices. In such a way, the storage array controller (106, 112, 118, 120) may be given more time to better organize what is written to the storage devices (146, 150), but after doing so, are not then mechanically limited like disk-based arrays are.

Each storage array (102, 104) depicted in FIG. 1 includes one or more storage devices (146, 150). A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, solid-state drives, and the like.

The storage array controllers (106, 112) of FIG. 1 may be useful in dynamically adjusting a number of storage devices that may be utilized to simultaneously service write operations according to some embodiments of the present disclosure. The storage array controllers (106, 112) may assist in dynamically adjusting a number of storage devices that may be utilized to simultaneously service write operations by: setting, for a component within the storage system, a logging level for the component, the logging level specifying the extent to which log data should be generated for a particular component; determining, in dependence upon one or more measured operating characteristics of the storage system, whether the logging level for the component should be changed; and responsive to determining that the logging level for the component should be changed, changing the logging level associated with the component; as well as performing other functions as will be described in greater detail below.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Dynamically adjusting a number of storage devices that may be utilized to simultaneously service write operations in accordance with embodiments of the present disclosure is generally implemented with computers. In the system of FIG. 1, for example, all the computing devices (164, 166, 168, 170) and storage controllers (106, 112, 118, 120) may be implemented to some extent at least as computers. For further explanation, therefore, FIG. 2 sets forth a block diagram of a storage array controller (202) useful in dynamically adjusting a number of storage devices that may be utilized to simultaneously service write operations according to some embodiments of the present disclosure.

Figure 2:
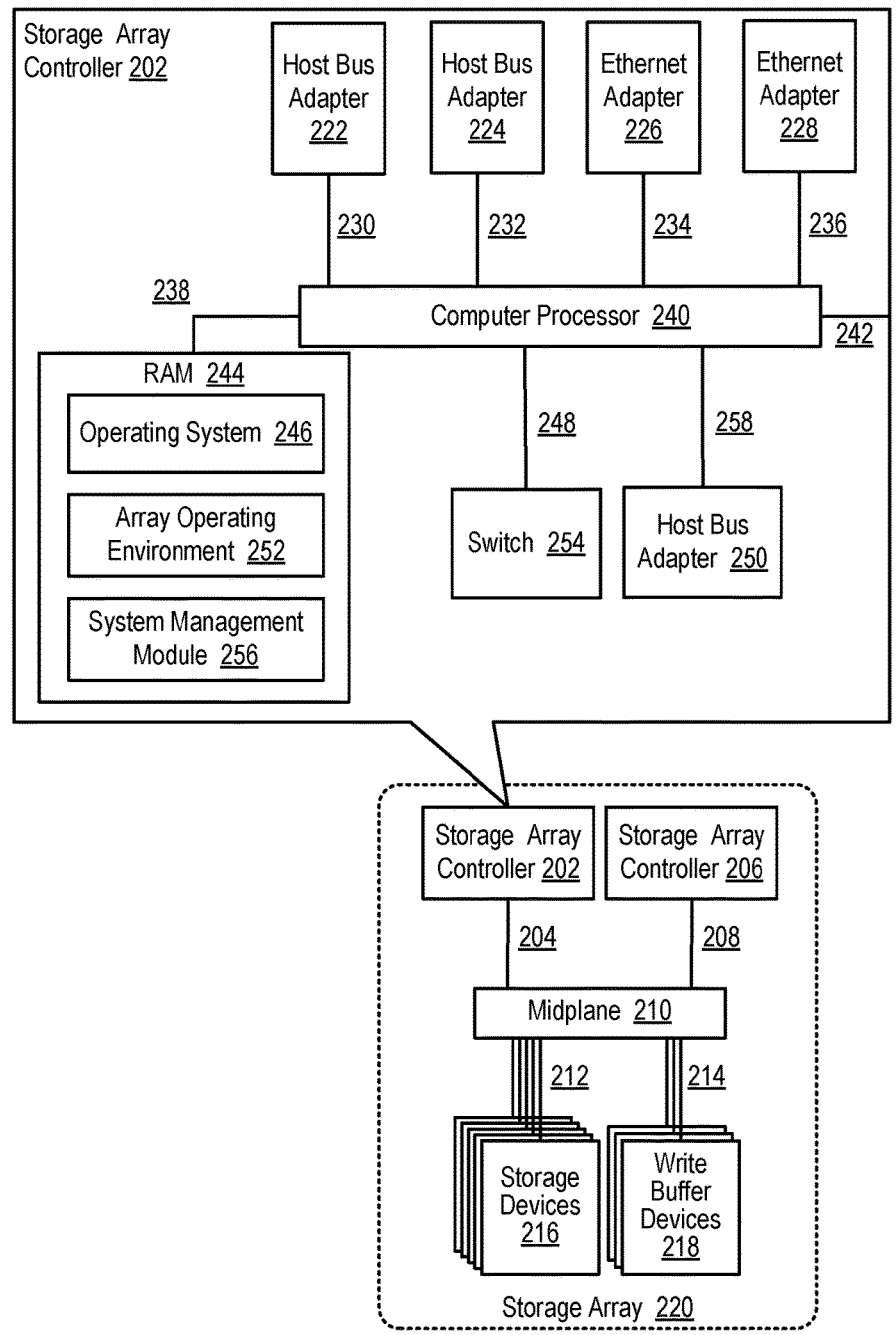
FIG. 2 sets forth a block diagram of a storage array controller useful in dynamically adjusting a number of storage devices that may be utilized to simultaneously service write operations according to some embodiments of the present disclosure.

The storage array controllers (202, 206) depicted in FIG. 2 may be similar to the storage array controllers depicted in FIG. 1, as the storage array controllers (202, 206) of FIG. 2 may be communicatively coupled, via a midplane (210), to one or more storage devices (216) and to one or more write buffer devices (218) that are included as part of a storage array (220). The storage array controllers (202, 206) may be coupled to the midplane (210) via one or more data communications links (204, 208) and the midplane (206) may be coupled to the storage devices (216) and the memory buffer devices (218) via one or more data communications links (212, 214). The data communications links (204, 208, 212, 214) of FIG. 2 may be embodied, for example, as a Peripheral Component Interconnect Express ('PCIe') bus, as a Serial Attached SCSI ('SAS') data communications link, and so on. Although only one of the storage array controllers (202) is depicted in detail, readers will appreciate that other storage array controllers (206) may include similar components. For ease of explanation, however, the detailed view of one of the storage array controllers (202) will be described below.

The storage array controller (202) detailed in FIG. 2 can include at least one computer processor (240) or 'CPU' as well as random access memory ('RAM') (244). The computer processor (240) may be connected to the RAM (244) via a data communications link (238), which may be embodied as a high speed memory bus such as a Double-Data Rate 4 ('DDR4') bus. Although the storage array controller (202) detailed in FIG. 2 includes only a single computer processor, however, readers will appreciate that storage array controllers useful in dynamically adjusting a number of storage devices that may be utilized to simultaneously service write operations according to some embodiments of the present disclosure may include additional computer processors. Likewise, although the storage array controller (202) detailed in FIG. 2 includes only a RAM (244), readers will appreciate that storage array controllers useful in dynamically adjusting a number of storage devices that may be utilized to simultaneously service write operations according to some embodiments of the present disclosure may include additional forms of computer memory such as flash memory.

The storage array controller (202) detailed in FIG. 2 includes an operating system (246) that is stored in RAM (246). Examples of operating systems useful in storage array controllers (202, 206) configured for [dynamically adjusting a number of storage devices that may be utilized to simultaneously service write operations according to some embodiments of the present disclosure include UNIX™, Linux™, Microsoft Windows™, and others as will occur to those of skill in the art. The operating system (246) depicted in FIG. 2 may be embodied, for example, as system software that manages computer hardware and software resources on the storage array controller (202).

The storage array controller (202) detailed in FIG. 2 also includes an array operating environment (252) that is stored in RAM (252). The array operating environment (252) may be embodied as one or more modules of computer program instructions used to enable the storage array controller (202) to service access requests that are directed to the storage array (220). The array operating environment (252) may be responsible for generating I/O requests (e.g., read requests, write requests) that are sent to the storage devices (216) or the write buffer devices (218). The array operating environment (252) may be further configured to perform various functions that result in more efficient utilization of the resources within the storage array (220). The array operating environment (252) may be configured, for example, to compress data prior to writing the data to one of the storage devices (216), to perform data deduplication operations, to pool data that is to be written to one of the storage devices (216) so that data may be written in blocks of a predetermined size, and so on.

The storage array controller (202) detailed in FIG. 2 also includes a system management module (256), a module that includes computer program instructions useful in dynamically adjusting a number of storage devices that may be utilized to simultaneously service write operations according to some embodiments of the present disclosure. The system management module (256) may include computer program instructions that, when executed, cause the storage array controller (202) to limit a number of storage devices within a failure domain that may be simultaneously servicing write operations to a number less than a number of storage devices that may be lost without resulting in a loss of data; determine that an event has occurred that requires additional write bandwidth; and responsive to determining that an event has occurred that requires additional write bandwidth, increasing the number of storage devices that may be simultaneously servicing write operations.

The storage array controller (202) detailed in FIG. 2 also includes a plurality of host bus adapters (222, 224, 250) including Ethernet adapters (226, 228), that are coupled to the computer processor (240) via a data communications link (230, 232, 258, 234, 236). Each host bus adapter (222, 224, 250) may be embodied as a module of computer hardware that connects the host system (i.e., the storage array controller) to other network and storage devices. Each of the host bus adapters (222, 224, 250, 226, 228) of FIG. 2 may be embodied, for example, as a Fibre Channel adapter that enables the storage array controller (202) to connect to a SAN, as an Ethernet adapter (226, 228) that enables the storage array controller (202) to connect to a LAN, as a Target Channel Adapter, as a SCSI/Storage Target Adapter, and so on. Each of the host bus adapters (222, 224, 250) may be coupled to the computer processor (240) via a data communications link (230, 232, 258) such as, for example, a PCIe bus.

The storage array controller (202) detailed in FIG. 2 also includes a switch (254) that is coupled to the computer processor (240) via a data communications link (248). The switch (254) of FIG. 2 may be embodied as a computer hardware device that can create multiple endpoints out of a single endpoint, thereby enabling multiple devices to share what was initially a single endpoint. The switch (254) of FIG. 2 may be embodied, for example, as a PCIe switch that is coupled to a PCIe bus and presents multiple PCIe connection points to the midplane (210).

The storage array controller (202) of FIG. 2 may also include a data communications link (242) for coupling the storage array controller (202) to other storage array controllers (206). Such a data communications link (242) may be embodied, for example, as a QuickPath Interconnect ('QPI') interconnect, as a PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
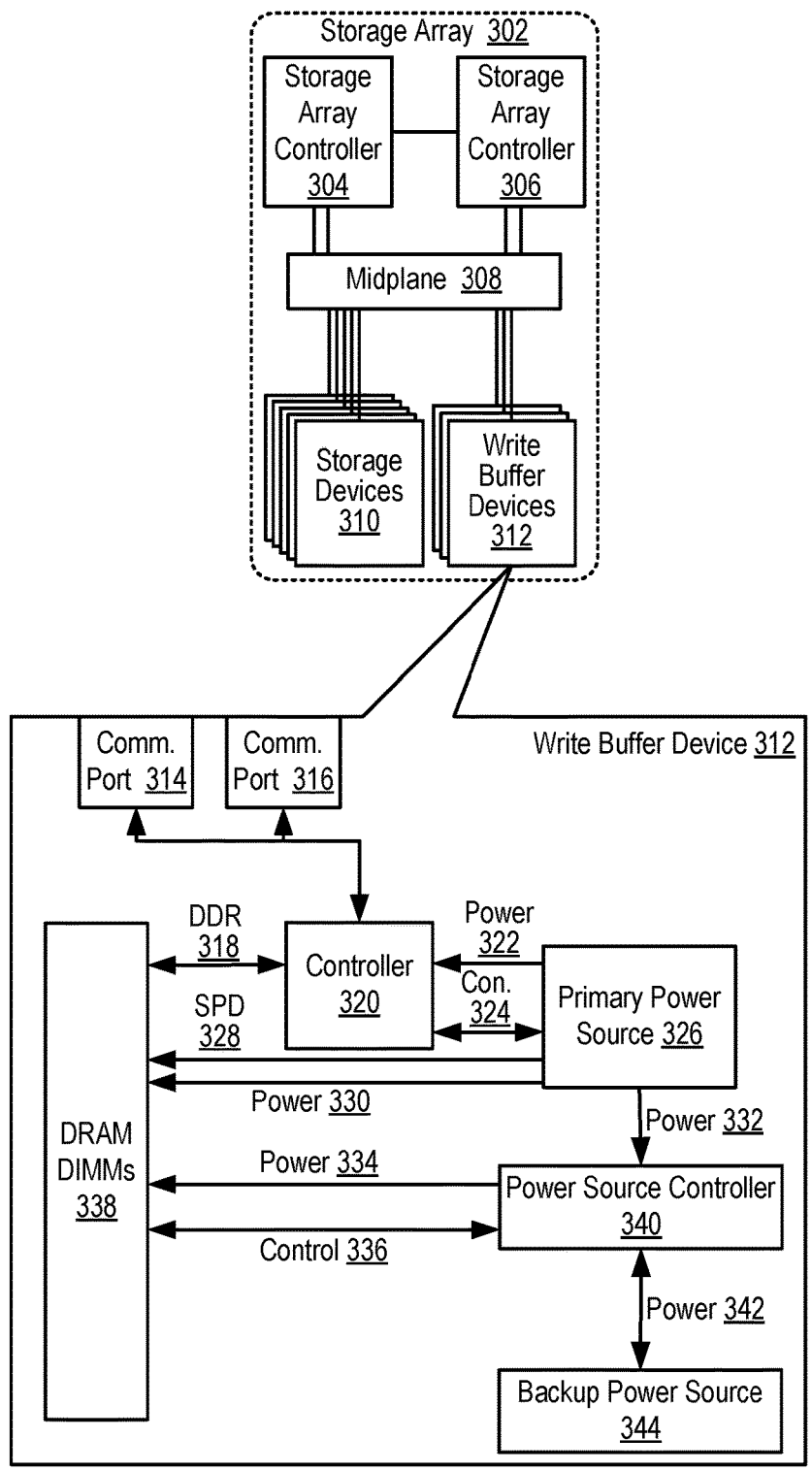
FIG. 3 sets forth a block diagram illustrating a write buffer device useful in storage systems configured for dynamically adjusting a number of storage devices that may be utilized to simultaneously service write operations according to some embodiments of the present disclosure.

For further explanation, FIG. 3 sets forth a block diagram illustrating a write buffer device (312) useful in storage systems configured for dynamically adjusting a number of storage devices that may be utilized to simultaneously service write operations according to some embodiments of the present disclosure. The write buffer device (312) depicted in FIG. 3 is similar to the write buffer devices depicted in FIG. 1 and FIG. 2. The write buffer device (312) may be included in a storage array (302) that includes a plurality of storage array controllers (304, 306) that are communicatively coupled to a plurality of storage devices (310) and also communicatively coupled to a plurality of write buffer devices (312) via a midplane (308).

The write buffer device (312) depicted in FIG. 3 includes two data communications ports (314, 316). The data communications ports (314, 316) of FIG. 3 may be embodied, for example, as computer hardware for communicatively coupling the write buffer device (312) to a storage array controller (304, 306) via the midplane (308). For example, the write buffer device (312) may be communicatively coupled to the first storage array controller (304) via a first data communications port (314) and the write buffer device (312) may also be communicatively coupled to the second storage array controller (306) via a second data communications port (316). Although the write buffer device (312) depicted in FIG. 3 includes two data communications ports (314, 316), readers will appreciate that write buffer devices useful for buffering data to be written to an array of non-volatile storage devices may include only one data communications port or, alternatively, additional data communications ports not depicted in FIG. 3.

The write buffer device (312) depicted in FIG. 3 also includes a controller (320). The controller (320) depicted in FIG. 3 may be embodied, for example, as computer hardware for receiving memory access requests (e.g., a request to write data to memory in the write buffer device) via the data communications ports (314, 316) and servicing such memory access requests. The controller (320) depicted in FIG. 3 may be embodied, for example, as an ASIC, as a microcontroller, and so on. The controller (320) depicted in FIG. 3 may be communicatively coupled the data communications ports (314, 316), for example, via a PCIe data communications bus.

The write buffer device (312) depicted in FIG. 3 also includes a plurality of DRAM memory modules, embodied in FIG. 3 as DRAM dual in-line memory modules ('DIMMs') (338). The DRAM DIMMs (338) depicted in FIG. 3 may be coupled to the controller (320) via a memory bus such as a DDR (318) memory bus such that the controller (320) can be configured to write data to the DRAM DIMMs (338) via the DDR (318) memory bus.

The write buffer device (312) depicted in FIG. 3 also includes a primary power source (326). The primary power source (326) may be embodied as computer hardware for providing electrical power to the computing components that are within the write buffer device (312). The primary power source (326) may be embodied, for example, as a switched-mode power supply that supplies electric energy to an electrical load by converting alternating current ('AC') power from a mains supply to a direct current ('DC') power, as a DC-to-DC converter that converts a source of direct current (DC) from one voltage level to another, and so on. The primary power source (326) of FIG. 3 is coupled to the controller (320) via a power line (322) that the primary power source (326) can use to deliver power to the controller (320). The primary power source (326) of FIG. 3 is also coupled to the DRAM DIMMs (338) via a power line (330) that the primary power source (326) can use to deliver power to the DRAM DIMMs (338). The primary power source (326) of FIG. 3 is also coupled to a power source controller (340) via a power line (332) that the primary power source (326) can use to deliver power to the power source controller (340). The primary power source (326) can monitor which components are receiving power through the use of one or more control lines (324), serial presence detect ('SPD') lines (328), or other mechanism for detecting the presence of a device and detecting that power is being provided to the device. Readers will appreciate that write devices useful for buffering data to be written to an array of non-volatile storage devices may include additional computing components not depicted in FIG. 3, each of which may also receive power from the primary power source (326).

The write buffer device (312) depicted in FIG. 3 also includes a backup power source (344). The backup power source (344) depicted in FIG. 3 represents a power source capable of providing power to the DRAM DIMMs (338) in the event that the primary power source (326) fails. In such a way, the DRAM DIMMs (338) may effectively serve as non-volatile memory, as a failure of the primary power source (326) will not cause the contents of the DRAM DIMMs (338) to be lost because the DRAM DIMMs (338) will continue to receive power from the backup power source (344). Such a backup power source (344) may be embodied, for example, as a supercapacitor.

The write buffer device (312) depicted in FIG. 3 also includes a power source controller (340). The power source controller (340) depicted in FIG. 3 may be embodied as a module of computer hardware configured to identify a failure of the primary power source (326) and to cause power to be delivered to the DRAM DIMMs (338) from the backup power source (344). In such an example, power may be delivered to the DRAM DIMMs (338) from the backup power source (344) via a first power line (342) between the power source controller (340) and the backup power source (344), as well as a second power line (334) between the backup power source controller (340) and the DRAM DIMMs (338). The backup power source controller (340) depicted in FIG. 3 may be embodied, for example, as an analog circuit, an ASIC, a microcontroller, and so on. The power source controller (340) can monitor whether the DRAM DIMMs (338) have power through the use of one or more control lines (336) that may be coupled to the DRAM DIMMs (338), as well as one or more control lines that may be coupled to the primary power source (326). In such an example, by exchanging signals between the DRAM DIMMs (338), the primary power source (326), and the power source controller (340), the power source controller (340) may identify whether power is being provided to the DRAM DIMMs (338) by the primary power source (326).

In the example depicted in FIG. 3, the controller (320) may be configured to receive, from a storage array controller (304, 306) via the one or more data communications ports (314, 316), an instruction to write data to the one or more DRAM DIMMs (338). Such an instruction may include, for example, the location at which to write the data, the data to be written to the DRAM DIMMs (338), the identity of the host that issued the instruction, the identity of a user associated with the instruction, or any other information needed to service the instruction. In the example depicted in FIG. 3, the NVRAM controller (320) may be further configured to write the data to the one or more DRAM DIMMs (338) in response to receiving such an instruction.

In the example depicted in FIG. 3, the controller (320) may be further configured to send an acknowledgment indicating that the data has been written to the array (302) of non-volatile storage devices in response to writing the data to the one or more DRAM DIMMs (338). The controller (320) may send the acknowledgment indicating that the data has been written to the array (302) of non-volatile storage devices in response to writing the data to the DRAM DIMMs (338) in the write buffer device (312). Readers will appreciate that although some forms of DRAM DIMMs (338) are considered to be volatile memory, because the DRAM DIMMs (338) are backed by redundant power sources (326, 344), writing the data to the DRAM DIMMs (338) in the write buffer device (312) may be treated the same as writing the data to traditional forms of non-volatile memory such as the storage devices (310). Furthermore, the DRAM DIMMs (338) in the write buffer device (312) can include one or more NVDIMMs. As such, once the data has been written to the DRAM DIMMs (338) in the write buffer device (312), an acknowledgement may be sent indicating that the data has been safely and persistently written to the array (302) of non-volatile storage devices.

In the example depicted in FIG. 3, the controller (320) may be further configured to determine whether the primary power source (326) has failed. The controller (320) may determine whether the primary power source (326) has failed, for example, by receiving a signal over the control line (324) indicating that the primary power source (326) has failed or is failing, by detecting a lack of power from the primary power source (326), and so on. In such an example, the controller (320) may be coupled to the backup power source (344) or may have access to another source of power such that the controller (320) can remain operational if the primary power source (326) does fail.

In the example depicted in FIG. 3, the controller (320) may be further configured to initiate a transfer of data contained in the one or more DRAM DIMMs (338) to flash memory in the write buffer device (312) in response to determining that the primary power source (326) has failed. The controller (320) may initiate a transfer of data contained in the one or more DRAM DIMMs (338) to flash memory in the write buffer device (312), for example, by signaling an NVDIMM to write the data contained in the one or more DRAM DIMMs (338) to flash memory on the NVDIMM, by reading the data contained in the one or more DRAM DIMMs (338) and writing such data to flash memory in the write buffer (312), or in other ways.

The embodiments below describe a storage cluster that stores user data, such as user data originating from one or more user or client systems or other sources external to the storage cluster. The storage cluster can distribute user data across storage nodes housed within a chassis, for example, using erasure coding and redundant copies of metadata. Erasure coding refers to a method of data protection or reconstruction in which data is stored across a set of different locations, such as disks, storage nodes, geographic locations, and so on. Flash memory is one type of solid-state memory that may be integrated with the embodiments, although the embodiments may be extended to other types of solid-state memory or other storage medium, including non-solid state memory. Control of storage locations and workloads may be distributed across the storage locations in a clustered peer-to-peer system. Tasks such as mediating communications between the various storage nodes, detecting when a storage node has become unavailable, and balancing I/Os (inputs and outputs) across the various storage nodes, may all be handled on a distributed basis. Data may be laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes may be included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are suitable. The chassis can provide a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as NFS, common internet file system (CIFS), SCSI, HTTP, or other suitable interface. Translation from the client protocol may occur at the switch, chassis external communication bus or within each storage node.

Each storage node may be one or more storage servers and each storage server may be connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM, and interfaces for the internal communication bus and power distribution for each of the power buses. Inside the storage node, the interfaces and storage unit may share a communication bus, e.g., PCI Express, in some embodiments. The non-volatile solid state memory units may directly access the internal communication bus interface through a storage node communication bus, or request the storage node to access the bus interface. The non-volatile solid state memory unit may contain an embedded CPU, solid state storage controller, and a quantity of solid state mass storage, e.g., between 2-32 terabytes (TB) in some embodiments. An embedded volatile storage medium, such as DRAM, and an energy reserve apparatus may be included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

One of many features of the storage nodes and non-volatile solid state storage may be the ability to proactively rebuild data in a storage cluster. The storage nodes and non-volatile solid state storage may be able to determine when a storage node or non-volatile solid state storage in the storage cluster is unreachable, independent of whether there is an attempt to read data involving that storage node or non-volatile solid state storage. The storage nodes and non-volatile solid state storage may then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 4:
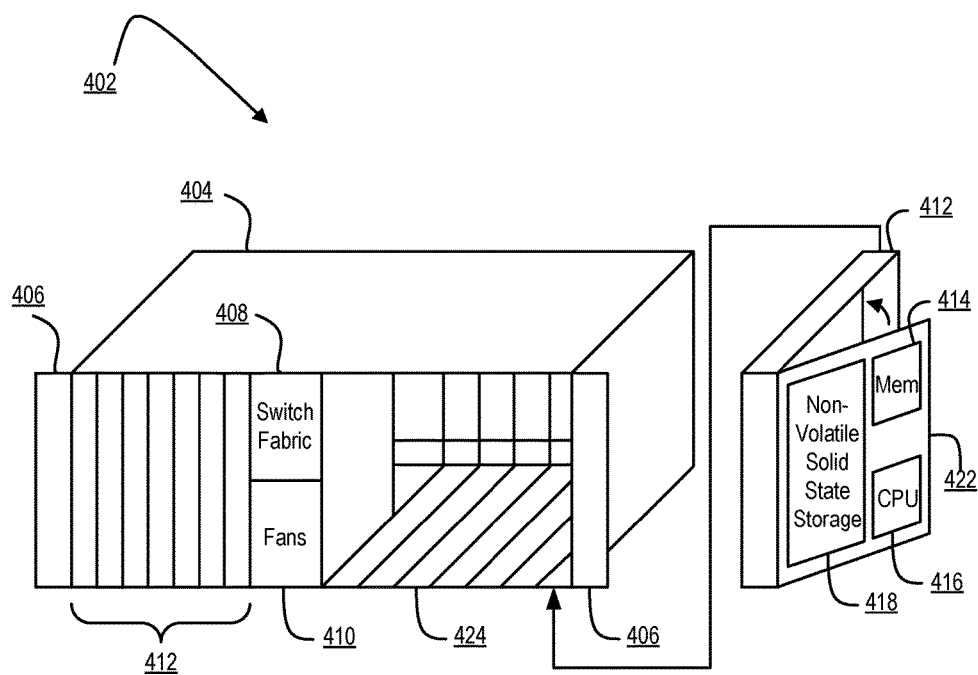
FIG. 4 illustrates a perspective view of a storage cluster with multiple storage nodes and internal solid-state memory coupled to each storage node to provide network attached storage or storage area network in accordance with some embodiments of the present disclosure.

FIG. 4 illustrates a perspective view of a storage cluster (402), with multiple storage nodes (412) and internal solid-state memory coupled to each storage node to provide network attached storage or storage area network, in accordance with some embodiments. A network attached storage, storage area network, or a storage cluster, or other storage memory, could include one or more storage clusters (402), each having one or more storage nodes (412), in a flexible and reconfigurable arrangement of both the physical components and the amount of storage memory provided thereby. The storage cluster (402) may be designed to fit in a rack, and one or more racks can be set up and populated as desired for the storage memory. The storage cluster (402) may include a chassis (404) having multiple slots (424). It should be appreciated that chassis (404) may be referred to as a housing, enclosure, or rack unit. In one embodiment, the chassis (404) has fourteen slots (424), although other numbers of slots are readily devised. For example, some embodiments have four slots, eight slots, sixteen slots, thirty-two slots, or other suitable number of slots. Each slot (424) can accommodate one storage node (412) in some embodiments. The chassis (404) may include flaps (406) that can be utilized to mount the chassis (404) on a rack. Fans (410) may provide air circulation for cooling of the storage nodes (412) and components thereof, although other cooling components could be used, or an embodiment could be devised without cooling components. A switch fabric (408) may couple storage nodes (412) within chassis (404) together and to a network for communication to the memory. In an embodiment depicted in FIG. 4, the slots (424) to the left of the switch fabric (408) and fans (410) are shown occupied by storage nodes (412), while the slots (424) to the right of the switch fabric (408) and fans (410) are empty and available for insertion of storage node (412) for illustrative purposes. This configuration is one example, and one or more storage nodes (412) could occupy the slots (424) in various further arrangements. The storage node arrangements need not be sequential or adjacent in some embodiments. Storage nodes (412) may be hot pluggable, meaning that a storage node (412) can be inserted into a slot (424) in the chassis (404), or removed from a slot (424), without stopping or powering down the system. Upon insertion or removal of a storage node (412) from a slot (424), the system may automatically reconfigure in order to recognize and adapt to the change. Reconfiguration, in some embodiments, includes restoring redundancy and/or rebalancing data or load.

Each storage node (412) can have multiple components. In the embodiment shown here, the storage node (412) includes a printed circuit board (422) populated by a CPU (416), i.e., processor, a memory (414) coupled to the CPU (416), and a non-volatile solid state storage (418) coupled to the CPU (416), although other mountings and/or components could be used in further embodiments. The memory (414) may include instructions which are executed by the CPU (416) and/or data operated on by the CPU (416). As further explained below, the non-volatile solid state storage (418) may include flash or, in further embodiments, other types of solid-state memory.

Referring to FIG. 4, the storage cluster (402) may be scalable, meaning that storage capacity with non-uniform storage sizes may be readily added, as described above. One or more storage nodes (412) can be plugged into or removed from each chassis and the storage cluster self-configures in some embodiments. Plug-in storage nodes (412), whether installed in a chassis as delivered or later added, can have different sizes. For example, in one embodiment a storage node (412) can have any multiple of 4 TB, e.g., 8 TB, 12 TB, 16 TB, 32 TB, etc. In further embodiments, a storage node (412) could have any multiple of other storage amounts or capacities. Storage capacity of each storage node (412) may be broadcast, and may influence decisions of how to stripe the data. For maximum storage efficiency, an embodiment can self-configure as wide as possible in the stripe, subject to a predetermined requirement of continued operation with loss of up to one, or up to two, non-volatile solid state storage (418) units or storage nodes (412) within the chassis.

Figure 5:
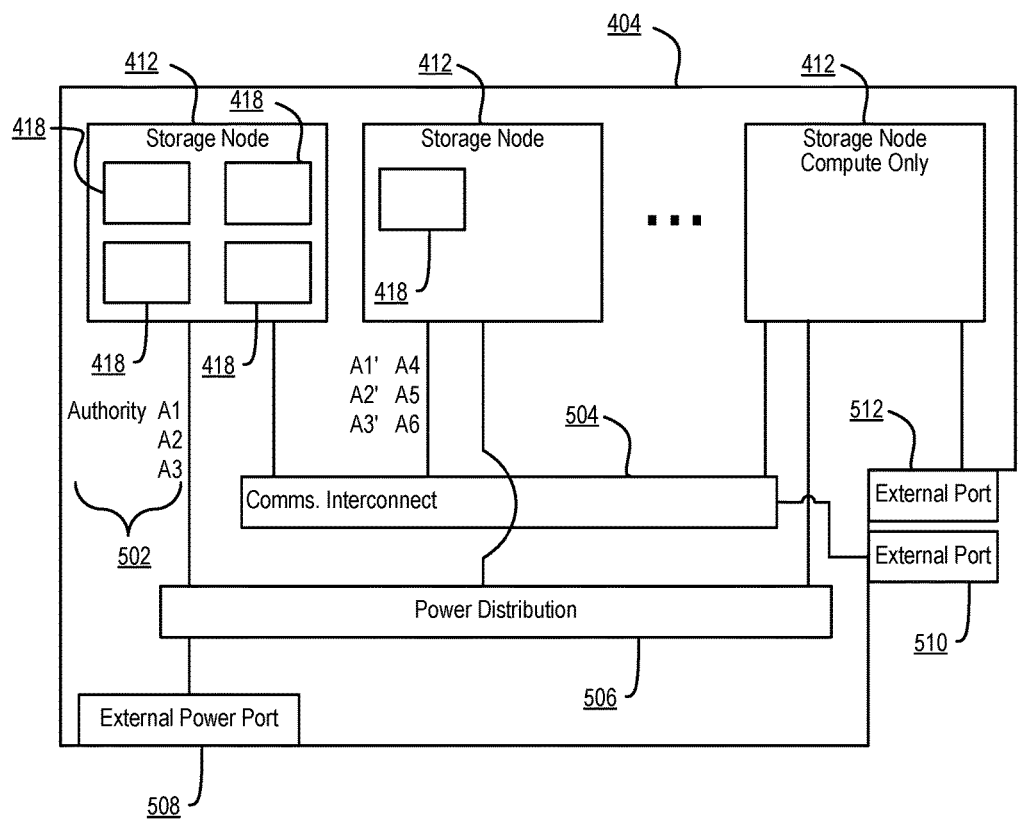
FIG. 5 illustrates a block diagram showing a communications interconnect and power distribution bus coupling multiple storage nodes according to some embodiments of the present disclosure.

FIG. 5 illustrates a block diagram showing a communications interconnect (504) and power distribution bus (506) coupling multiple storage nodes (412) according to some embodiments of the present disclosure. Referring back to FIG. 4, the communications interconnect (504) can be included in or implemented with the switch fabric (408) in some embodiments. Where multiple storage clusters occupy a rack, the communications interconnect (504) can be included in or implemented with a top of rack switch, in some embodiments. In the example depicted in FIG. 5, the storage cluster may be enclosed within a single chassis (404). An external port (510) may be coupled to storage nodes (412) through the communications interconnect (504), while another external port (512) may be coupled directly to a storage node (412). An external power port (508) may be coupled to a power distribution bus (506). The storage nodes (412) may include varying amounts and differing capacities of non-volatile solid state storage (418) as described with reference to FIG. 4. In addition, one or more storage nodes (412) may be a compute only storage node as illustrated in FIG. 5. Authorities (502) may be implemented on the non-volatile solid state storage (418), for example as lists or other data structures stored in memory. In some embodiments the authorities may be stored within the non-volatile solid state storage (418) and supported by software executing on a controller or other processor of the non-volatile solid state storage (418). In a further embodiment, the authorities (502) may be implemented on the storage nodes (412), for example, as lists or other data structures stored in memory and supported by software executing on a CPU of the storage node (412). The authorities (502) may control how and where data is stored in the non-volatile solid state storage (418) in some embodiments. This control may assist in determining which type of erasure coding scheme is applied to the data, and which storage nodes (412) have which portions of the data. Each authority (502) may be assigned to a non-volatile solid state storage (418). Each authority may also control a range of inode numbers, segment numbers, or other data identifiers which are assigned to data by a file system, by the storage nodes (412), or by the non-volatile solid state storage (418), in various embodiments.

Every piece of data, and every piece of metadata, may have redundancy in the system in some embodiments. In addition, every piece of data and every piece of metadata may have an owner, which may be referred to as an authority (502). If that authority (502) is unreachable, for example through failure of a storage node (412), there may be a plan of succession for how to find that data or that metadata. In various embodiments, there are redundant copies of authorities (502). Authorities (502) may have a relationship to storage nodes (412) and to non-volatile solid state storage (418) in some embodiments. Each authority (502), covering a range of data segment numbers or other identifiers of the data, may be assigned to a specific non-volatile solid state storage (418). In some embodiments the authorities (502) for all of such ranges are distributed over the non-volatile solid state storage (418) of a storage cluster. Each storage node (412) may have a network port that provides access to the non-volatile solid state storage (418) of that storage node (412). Data can be stored in a segment, which is associated with a segment number and that segment number is an indirection for a configuration of a RAID stripe in some embodiments. The assignment and use of the authorities (502) may therefore establish an indirection to data. Indirection may be referred to as the ability to reference data indirectly, in this case via an authority (502), in accordance with some embodiments. A segment may identify a set of non-volatile solid state storage (418) and a local identifier into the set of non-volatile solid state storage (418) that may contain data. In some embodiments, the local identifier is an offset into the device and may be reused sequentially by multiple segments. In other embodiments the local identifier is unique for a specific segment and never reused. The offsets in the non-volatile solid state storage (418) may be applied to locating data for writing to or reading from the non-volatile solid state storage (418) (in the form of a RAID stripe). Data may be striped across multiple units of non-volatile solid state storage (418), which may include or be different from the non-volatile solid state storage (418) having the authority (502) for a particular data segment.

If there is a change in where a particular segment of data is located, e.g., during a data move or a data reconstruction, the authority (502) for that data segment may be consulted, at that non-volatile solid state storage (418) or storage node (412) having that authority (502). In order to locate a particular piece of data, embodiments calculate a hash value for a data segment or apply an inode number or a data segment number. The output of this operation points to a non-volatile solid state storage (418) having the authority (502) for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage (418), which may be done through an explicit mapping. The operation is repeatable, so that when the calculation is performed, the result of the calculation repeatably and reliably points to a particular non-volatile solid state storage (418) having that authority (502). The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage (418) for an authority in the presence of a set of non-volatile solid state storage (418) that are reachable and constitute the same cluster. The calculation also determines an ordered set of peer non-volatile solid state storage (418) that will also record the authority to non-volatile solid state storage mapping so that the authority may be determined even if the assigned non-volatile solid state storage is unreachable. A duplicate or substitute authority (502) may be consulted if a specific authority (502) is unavailable in some embodiments.

With reference to FIGS. 4 and 5, two of the many tasks of the CPU (416) on a storage node (412) are to break up write data and reassemble read data. When the system has determined that data is to be written, the authority (502) for that data is located as above. When the segment ID for data is already determined the request to write is forwarded to the non-volatile solid state storage (418) currently determined to be the host of the authority (502) determined from the segment. The host CPU (416) of the storage node (412), on which the non-volatile solid state storage (418) and corresponding authority (502) reside, may then breaks up or shard the data and transmits the data out to various non-volatile solid state storage (418). The transmitted data may be written as a data stripe in accordance with an erasure coding scheme. In some embodiments, data is requested to be pulled, and in other embodiments, data is pushed. In reverse, when data is read, the authority (502) for the segment ID containing the data is located as described above. The host CPU (416) of the storage node (412) on which the non-volatile solid state storage (418) and corresponding authority (502) reside may request the data from the non-volatile solid state storage and corresponding storage nodes pointed to by the authority. In some embodiments the data is read from flash storage as a data stripe. The host CPU (416) of storage node (412) may then reassemble the read data, correcting any errors (if present) according to the appropriate erasure coding scheme, and forward the reassembled data to the network. In further embodiments, some or all of these tasks can be handled in the non-volatile solid state storage (418). In some embodiments, the segment host requests the data be sent to storage node (412) by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution may be an entity, and an entity can be a file, a directory or a segment. That is, entities are units of data or metadata stored by a storage system. Entities may be grouped into sets called authorities. Each authority may have an authority owner, which is a storage node that has the exclusive right to update the entities in the authority. In other words, a storage node may contain the authority, and that the authority may, in turn, contain entities.

A segment may be a logical container of data in accordance with some embodiments. A segment may be an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment may be protected, e.g., from memory and other failures, by breaking the segment into a number of data and parity shards, where applicable. The data and parity shards may be distributed, i.e., striped, across non-volatile solid state storage (418) coupled to the host CPUs (416) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations may take place across an entire storage system. At the top may be the directory entries (file names) which link to an inode. Inodes may point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses may then be translated into physical flash locations. Physical flash locations may have an address range bounded by the amount of flash in the system in accordance with some embodiments. Medium addresses and segment addresses may be logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage (418) unit may be assigned a range of address space. Within this assigned range, the non-volatile solid state storage (418) may be able to allocate addresses without synchronization with other non-volatile solid state storage (418).

Data and metadata may be stored by a set of underlying storage layouts that are optimized for varying workload patterns and storage devices. These layouts may incorporate multiple redundancy schemes, compression formats and index algorithms. Some of these layouts may store information about authorities and authority masters, while others may store file metadata and file data. The redundancy schemes may include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding may be used within a storage cluster, and mirroring may be used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes may agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing (RUSH) family of hashes, including Controlled Replication Under Scalable Hashing (CRUSH). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures may lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy may be independent of the placement of authorities for data consistency. In some embodiments, storage nodes that contain authorities may not contain any persistent storage. Instead, the storage nodes may be connected to non-volatile solid state storage units that do not contain authorities. The communications interconnect between storage nodes and non-volatile solid state storage units can consist of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters may be connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners may have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority may be transferred to a new storage node. Transient failures can make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system may go into a self-preservation mode and halt replication and data movement activities until an administrator intervenes in accordance with some embodiments.

Persistent messages may be persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address may virtualize addresses. These virtualized addresses may not change over the lifetime of the storage system, regardless of component failures and replacements. This allows each component of the storage system to be replaced over time without reconfiguration or disruptions of client request processing.

In some embodiments, the virtualized addresses are stored with sufficient redundancy. A continuous monitoring system may correlate hardware and software status and the hardware identifiers. This allows detection and prediction of failures due to faulty components and manufacturing details. The monitoring system may also enable the proactive transfer of authorities and entities away from impacted devices before failure occurs by removing the component from the critical path in some embodiments.

Figure 6:
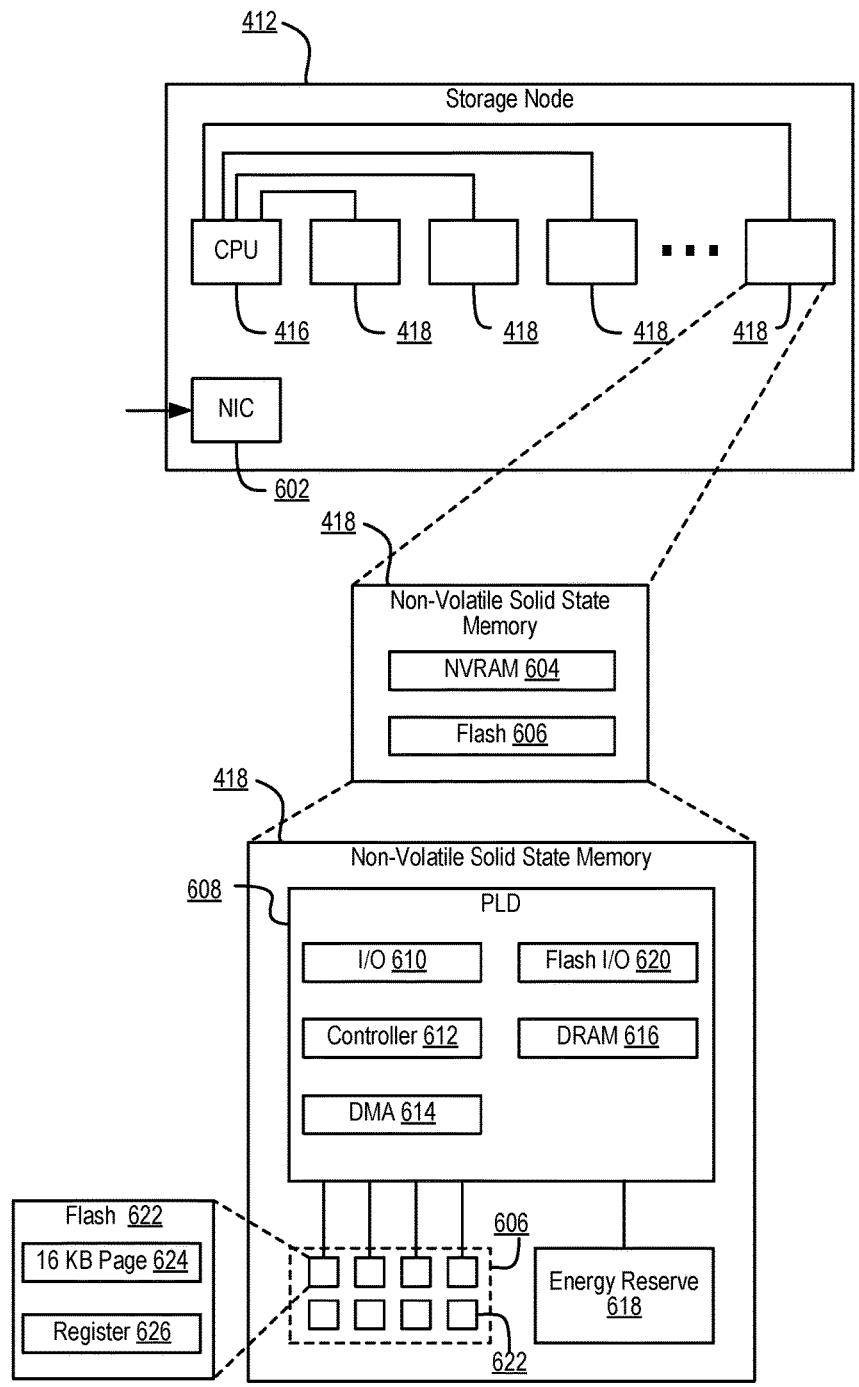
FIG. 6 is a multiple level block diagram, showing contents of a storage node and contents of a non-volatile solid state storage of the storage node according to some embodiments of the present disclosure.

FIG. 6 is a multiple level block diagram, showing contents of a storage node (412) and contents of a non-volatile solid state storage (418) of the storage node (412) according to some embodiments of the present disclosure. Data may be communicated to and from the storage node (412) by a network interface controller (NIC) (602) in some embodiments. Each storage node (412) may include a CPU (416), and one or more non-volatile solid state storage (418), as discussed above. Moving down one level in FIG. 6, each non-volatile solid state storage (418) may have a relatively fast non-volatile solid state memory, such as NVRAM (604), and flash memory (606). In some embodiments, NVRAM (604) may be a component that does not require program/ erase cycles (DRAM, MRAM, PCM), and can be a memory that can support being written vastly more often than the memory is read from. Moving down another level in FIG. 6, the NVRAM (604) may be implemented in one embodiment as high speed volatile memory, such as DRAM (616), backed up by an energy reserve (618). The energy reserve (618) may provide sufficient electrical power to keep the DRAM (616) powered long enough for contents to be transferred to the flash memory (606) in the event of power failure. In some embodiments, the energy reserve (618) is a capacitor, super-capacitor, battery, or other device, that supplies a suitable supply of energy sufficient to enable the transfer of the contents of DRAM (616) to a stable storage medium in the case of power loss. The flash memory (616) may be implemented as multiple flash dies (622), which may be referred to as packages of flash dies (622) or an array of flash dies (622). It should be appreciated that the flash dies (622) could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage (418) has a controller (612) or other processor, and an I/O port (610) coupled to the controller (612). The I/O (610) port may be coupled to the CPU (416) and/or the network interface controller (602) of the flash storage node (412). A flash I/O (620) port may be coupled to the flash dies (622), and a DMA (614) unit may be coupled to the controller (612), the DRAM (616), and the flash dies (622). In the embodiment shown, the I/O (610) port, controller (612), DMA unit (614), and flash I/O (620) port may be implemented on a programmable logic device (PLD) (608), e.g., an FPGA. In this embodiment, each flash die (622) has pages, organized as sixteen kB (kilobyte) pages (624) and a register (626) through which data can be written to or read from the flash die (622). In further embodiments, other types of solid-state memory are used in place of, or in addition to flash memory illustrated within flash die (622).

Storage clusters, in various embodiments as disclosed herein, can be contrasted with storage arrays in general. The storage nodes (412) may be part of a collection that creates the storage cluster. Each storage node (412) may own a slice of data and computing required to provide the data. Multiple storage nodes (412) can cooperate to store and retrieve the data. Storage memory or storage devices, as used in storage arrays in general, may be less involved with processing and manipulating the data. Storage memory or storage devices in a storage array may receive commands to read, write, or erase data. The storage memory or storage devices in a storage array may not be aware of a larger system in which they are embedded, or what the data means. Storage memory or storage devices in storage arrays can include various types of storage memory, such as RAM, solid state drives, hard disk drives, etc. The non-volatile solid state storage (418) units described herein may have multiple interfaces active simultaneously and serving multiple purposes. In some embodiments, some of the functionality of a storage node (412) is shifted into a non-volatile solid state storage (418) unit, transforming the non-volatile solid state storage (418) unit into a combination of non-volatile solid state storage (418) unit and storage node (412). Placing computing (relative to storage data) into the non-volatile solid state storage (418) unit places this computing closer to the data itself. The various system embodiments have a hierarchy of storage node layers with different capabilities. By contrast, in a storage array, a controller may own and know everything about all of the data that the controller manages in a shelf or storage devices. In a storage cluster, as described herein, multiple controllers in multiple non-volatile solid state storage (418) units and/or storage nodes (412) may cooperate in various ways (e.g., for erasure coding, data sharding, metadata communication and redundancy, storage capacity expansion or contraction, data recovery, and so on).

Figure 7:
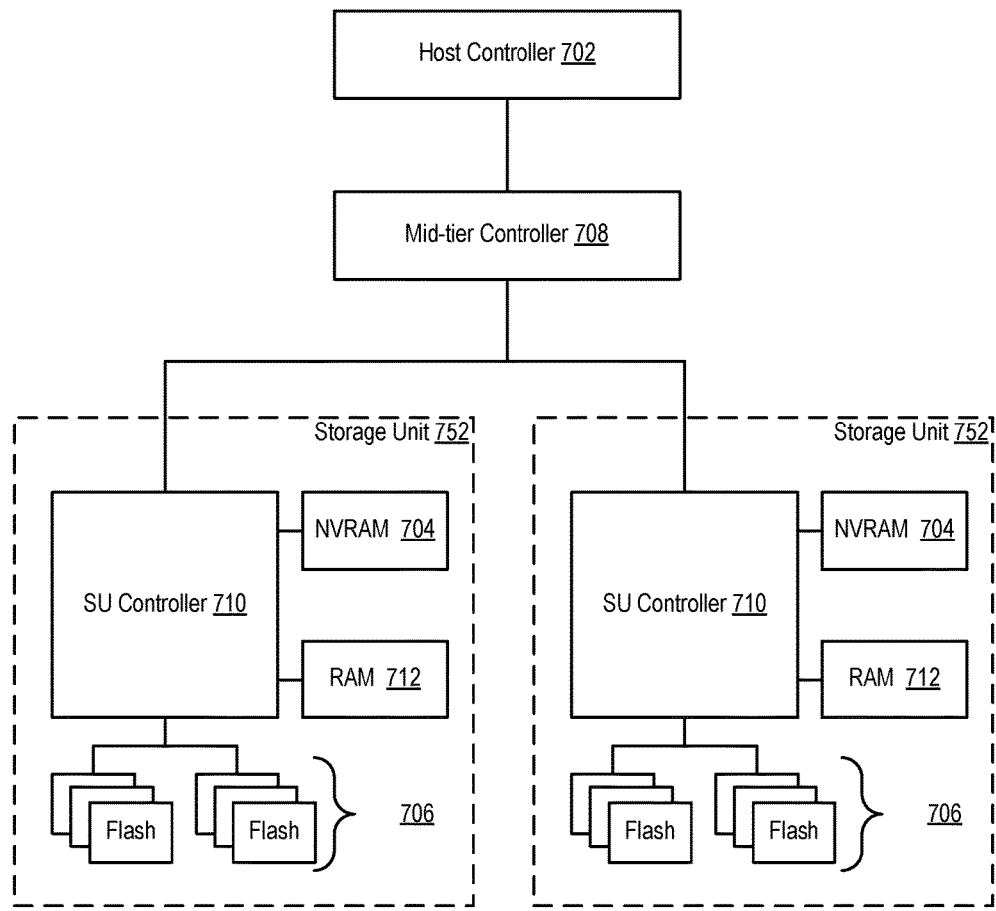
FIG. 7 illustrates a storage server environment which may utilize embodiments of the storage nodes and storage units according to some embodiments of the present disclosure.

FIG. 7 illustrates a storage server environment, which may utilize embodiments of the storage nodes and storage units according to some embodiments of the present disclosure. Each storage unit (752) depicted in FIG. 7 can include a processor (e.g., such as controller (612 in FIG. 7), an FPGA, RAM (712), flash memory (706), and NVRAM (704) on a PCIe board in a chassis. The storage unit (752) may be implemented as a single board containing storage, and may be the largest tolerable failure domain inside the chassis. In some embodiments, up to two storage units (752) may fail and the device will continue with no data loss.

The physical storage may be divided into named regions based on application usage in some embodiments. The NVRAM (704) may be a contiguous block of reserved memory in the storage unit (752) DRAM that is backed by NAND flash. The NVRAM (704) may be logically divided into multiple memory regions written for two as spool (e.g., spool region). Space within the NVRAM (752) spools may be managed by each authority independently. Each device can provide an amount of storage space to each authority. That authority can further manage lifetimes and allocations within that space. Examples of a spool include distributed transactions or notions. When the primary power to a storage unit (752) fails, onboard super-capacitors can provide a short duration of power hold up. During this holdup interval, the contents of the NVRAM (704) may be flushed to flash memory (706). On the next power-on, the contents of the NVRAM (704) may be recovered from the flash memory (706).

As for the storage unit controller, the responsibility of the logical "controller" may be distributed across each of the blades containing authorities. This distribution of logical control is shown in FIG. 7 as a host controller (702), a mid-tier controller (708), and one or more storage unit controller (710). Management of the control plane and the storage plane are treated independently, although parts may be physically co-located on the same blade. Each authority can effectively serve as an independent controller. Each authority can provide its own data and metadata structures, its own background workers, and maintains its own lifecycle.

Figure 8:
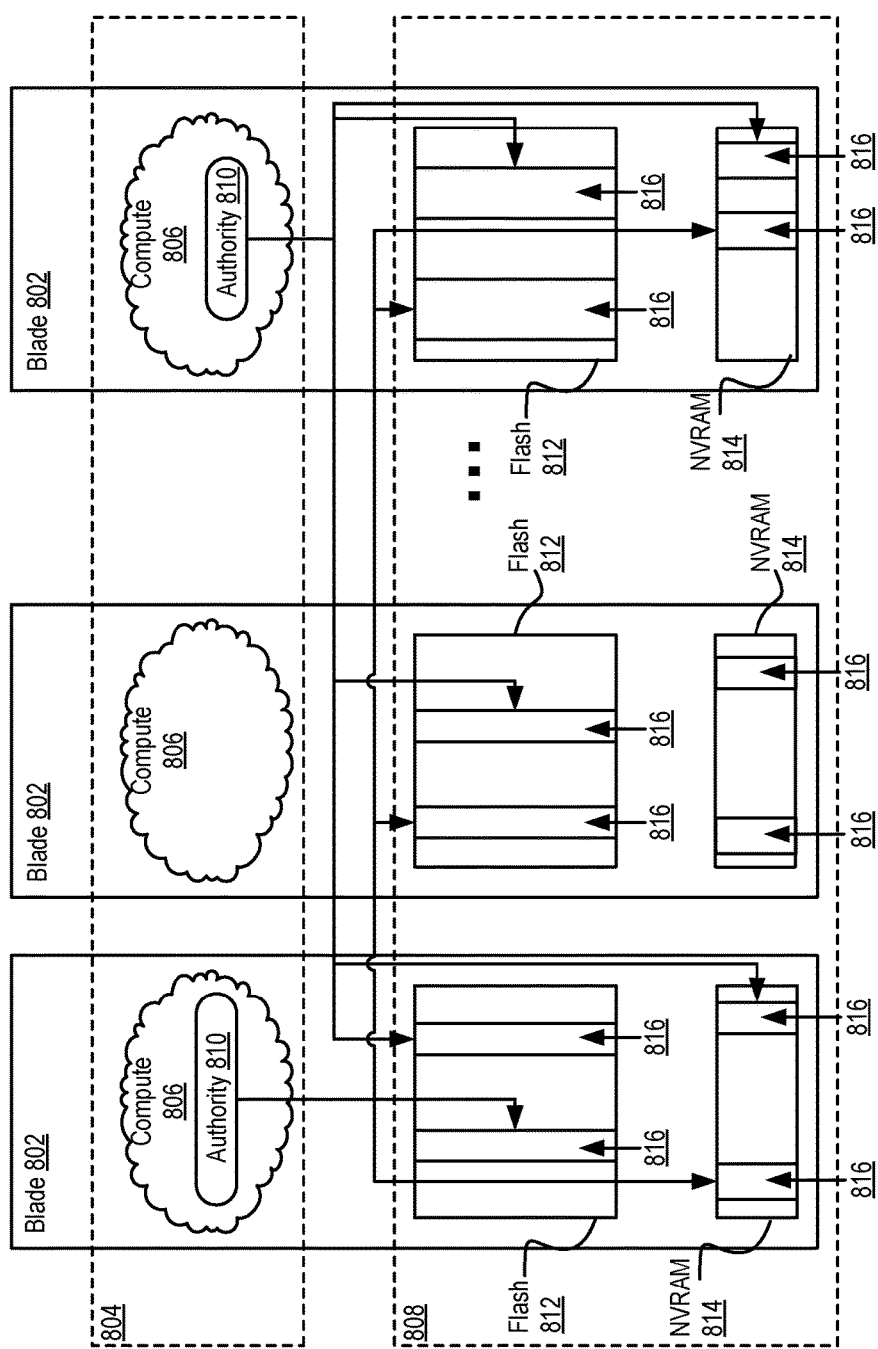
FIG. 8 illustrates a blade hardware block diagram according to some embodiments of the present disclosure.

FIG. 8 illustrates a blade (802) hardware block diagram according to some embodiments of the present disclosure. The example depicted in FIG. 8 includes a control plane (804), a compute plane (806), a storage plane (808), and authorities (810) interacting with underlying physical resources, using embodiments of the storage nodes, non-volatile solid state storage, storage units, or any combination thereof. The control plane (804) may be partitioned into a number of authorities (810) which can use the compute resources in the compute plane (806) to run on any of the blades (802). The storage plane (808) may be partitioned into a set of devices, each of which provides access to flash (812) and NVRAM (814) resources.

In the compute plane (806) and storage planes (808) of FIG. 8, the authorities (810) may interact with the underlying physical resources (i.e., devices). From the point of view of an authority (810), its resources may be striped over multiple the physical devices. From the point of view of a device, it provides resources to multiple authorities (810), irrespective of where the authorities happen to run. In order to communicate and represent the ownership of an authority (810), including the right to record persistent changes on behalf of that authority (810), the authority (810) may provide some evidence of authority ownership that can be independently verifiable. A token, for example, may be employed for this purpose and function in one embodiment.

Each authority (810) may have allocated or have been allocated one or more partitions (816) of storage memory in the storage units, e.g. partitions (816) in flash memory (812) and NVRAM (814). Each authority (810) may use those allocated partitions (816) that belong to it, for writing or reading user data. Authorities can be associated with differing amounts of physical storage of the system. For example, one authority (810) could have a larger number of partitions (816) or larger sized partitions (816) in one or more storage units than one or more other authority (810).

Readers will appreciate that the storage systems and the components that are contained in such storage systems, as described in the present disclosure, are included for explanatory purposes and do not represent limitations as to the types of systems that may be configured for on-demand content filtering of snapshots. In fact, storage systems configured for dynamically adjusting a number of storage devices that may be utilized to simultaneously service write operations may be embodied in many other ways and may include fewer, additional, or different components. For example, storage within storage systems configured for dynamically adjusting a number of storage devices that may be utilized to simultaneously service write operations may be embodied as block storage where data is stored in blocks, and each block essentially acts as an individual hard drive. Alternatively, storage within storage systems configured for dynamically adjusting a number of storage devices that may be utilized to simultaneously service write operations may be embodied as object storage, where data is managed as objects. Each object may include the data itself, a variable amount of metadata, and a globally unique identifier, where object storage can be implemented at multiple levels (e.g., device level, system level, interface level). In addition, storage within storage systems configured for dynamically adjusting a number of storage devices that may be utilized to simultaneously service write operations may be embodied as file storage in which data is stored in a hierarchical structure. Such data may be saved in files and folders, and presented to both the system storing it and the system retrieving it in the same format. Such data may be accessed using the Network File System ('NFS') protocol for Unix or Linux, Server Message Block ('SMB') protocol for Microsoft Windows, or in some other manner.

Figure 9:
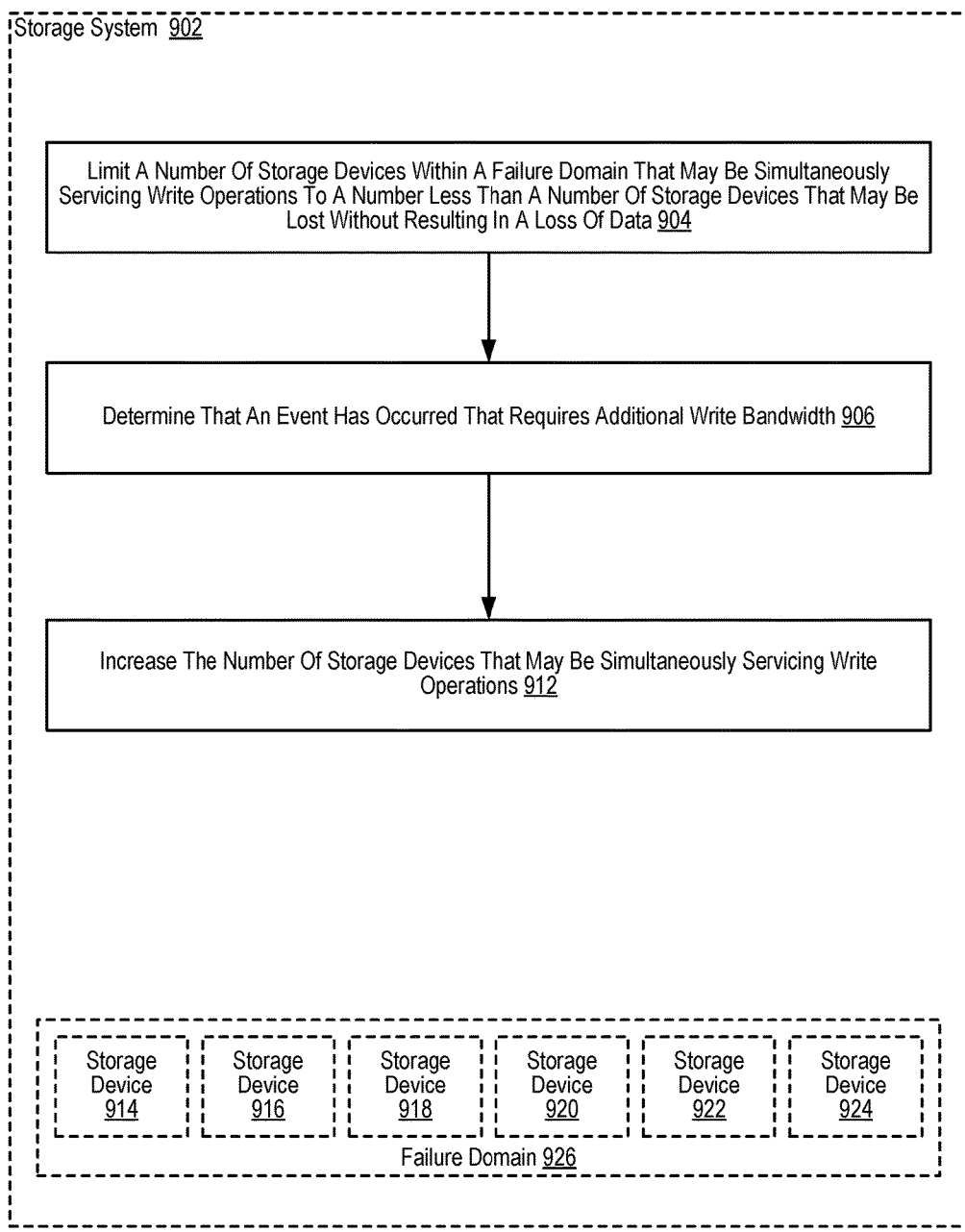
FIG. 9 sets forth a flow chart illustrating an example method of dynamically adjusting a number of storage devices that may be utilized to simultaneously service write operations system that includes a plurality of storage devices according to some embodiments of the present disclosure.

For further explanation, FIG. 9 sets forth a flow chart illustrating an example method of dynamically adjusting a number of storage devices that may be utilized to simultaneously service write operations according to some embodiments of the present disclosure. Although depicted in less detail, the storage system (902) depicted in FIG. 9 may be similar to the storage systems described above with reference to FIGS. 1-8. Such a storage system may include a system management module similar to that set forth in the example of FIG. 2. Such a system management module (256) may carry out the method of FIG. 9. The storage system (902) depicted in FIG. 9 may also include a plurality of storage devices (914, 916, 918, 920, 922, 924). The storage devices may be configured in a failure domain (926). A failure domain as the term is used here refers to a set of storage devices configured for high availability of data stored on the storage devices within the domain. Such a failure domain may be configured in such a way so that one or more storage devices may be lost without the loss of data stored on those storage devices. An example of a failure domain may be a RAID group. In such a RAID group, depending on the RAID level implemented, a certain number of storage devices (referred to as parity drives here) may be lost without resulting in a loss of data. The term 'lost' as it used to describe a storage device refers to a storage device from which the storage system cannot access data. Data stored on a storage device may be inaccessible for a variety of reasons including an error or failure of hardware adapter coupling the storage device to the storage system, a hardware error or failure of the storage device, a software or firmware error or failure interrupting data communications between the storage device and the remainder of the storage system, and so on as will occur to readers of skill in the art.

In a storage system configured with a failure domain, a read operation directed at one storage device may be effected by a reconstruction of the data from other storage devices using the data reconstruction algorithms for failure domain's parity configuration. In this way, if the storage device targeted by a read operation is busy, the read operation may be carried out by reconstructing the data targeted by the read from other storage devices in the failure domain. To carry out a reconstructive read operation, P or fewer storage devices (including the storage device targeted by the read operation) can be busy, where P represents the number of parity storage devices in the failure domain. Consider, for example, a failure domain comprising eight storage devices, where two storage devices are required for parity. Consider also that a first storage device of the failure domain is busy when a read operation targeting that first storage device is issued. In such an example, the read operation targeting the first storage device may be effected by a reconstructive read if no more than one storage device in the failure domain other than the first storage device is busy.

A storage device, however, is considered busy for the purposes of a reconstructive read if the storage device is 'writing' or, said another way, effecting a write operation. As such, enabling multiple storage devices in a failure domain to write simultaneously, thus increasing the number of 'busy' storage devices in the failure domain, may adversely affect the ability of the storage system to carry out reconstructive reads. However, in some instances, increased bandwidth for write operations may be desired. As such, there exists a constantly varying balance between providing the ability to perform reconstructive read operations and providing additional write bandwidth.

To that end, the method of FIG. 9 includes limiting (904) a number of storage devices within a failure domain that may be simultaneously servicing write operations to a number less than a number of storage devices that may be lost without resulting in a loss of data. Limiting (904) the number of storage devices within a failure domain that may be simultaneously servicing write operations may be carried out in variety of ways including limiting the number of storage devices that may be servicing writing operations to one or to any number less than the number of parity storage devices in the failure domain. Consider, for example, a failure domain (926) that includes six storage devices (914, 16, 918, 920, 922, 924). Consider that the failure domain is configured for two parity storage devices. That is, the failure domain may suffer a loss of two storage devices, without losing any data stored within the failure domain. In such an embodiment, limiting (904) the number of storage devices that may be simultaneously servicing write operations may be carried out by limiting the number of storage devices that may be servicing write operations to one.

The method of FIG. 9 also includes determining (906) that an event has occurred that requires additional write bandwidth. In the example method of FIG. 9, an event that requires additional write bandwidth may be embodied, for example, as a particular device in the storage system (902) reaching a predetermined utilization threshold, as an I/O pattern or workload that is being serviced by the storage system (902) exhibiting certain characteristics, or as many other events. For example, when a write buffer device as described above with reference to FIGS. 1-8 reaches a predetermined utilization threshold (e.g., the write buffer device is 95% full), the system management module (256) may determine (410) that an event has occurred that requires additional write bandwidth as at least a portion of the contents of the write buffer device will need to be written to the storage devices (914-924) prior to freeing memory on the write buffer devices. As another example, when the number of incoming write operations received by the storage system reaches a predetermined threshold, the system management module (256) may determine (906) that an event has occurred that requires additional write bandwidth in order for the storage system (902) to prevent overtaxing various resources such as write buffers, write queues, and so on. Readers will appreciate that other events such as a write queue reaching a predetermined size, a read workload falling below a predetermined threshold, or some other event may trigger the need for additional write bandwidth.

Responsive to determining that an event has occurred that requires additional write bandwidth, the method of FIG. 9 continues by increasing (912) the number of storage devices that may be simultaneously servicing write operations. Increasing (912) the number of storage devices that may be simultaneously servicing write operations may be carried out in a variety of ways. For example, increasing (912) the number of storage devices that may be simultaneously servicing write operations may be carried increasing the number to any number less than or equal to the number of parity storage devices. In some embodiments, such as an embodiment in which the number of storage devices simultaneously servicing write operations is initially limited to one storage device, increasing (921) the number of storage devices that may be simultaneously servicing write operations is carried out by increasing the number by one storage device. Consider, for example, a failure domain (926), having six storage devices (914-924) where the number of parity storage devices is three. In such an embodiment, the number of drives servicing write operations is initially limited (904) to one. Then, after determining (906) that an event has occurred that requires additional write bandwidth, the storage system (902) may increase the number of storage devices that may simultaneously service write operations to two.

In some embodiments, increasing (912) the number of storage devices that may be simultaneously servicing write operations is carried out by increasing the number to one less than the number of parity storage devices or a number equal to the number of parity storage devices. Continuing with the above example of a failure domain (926) including six storage devices (914-924) with a parity of three and an initial write servicing limit of one, the storage system (902) may increase (912) the number of storage devices that may be simultaneously servicing write operations by increasing (912) the number to three.

Figure 10:
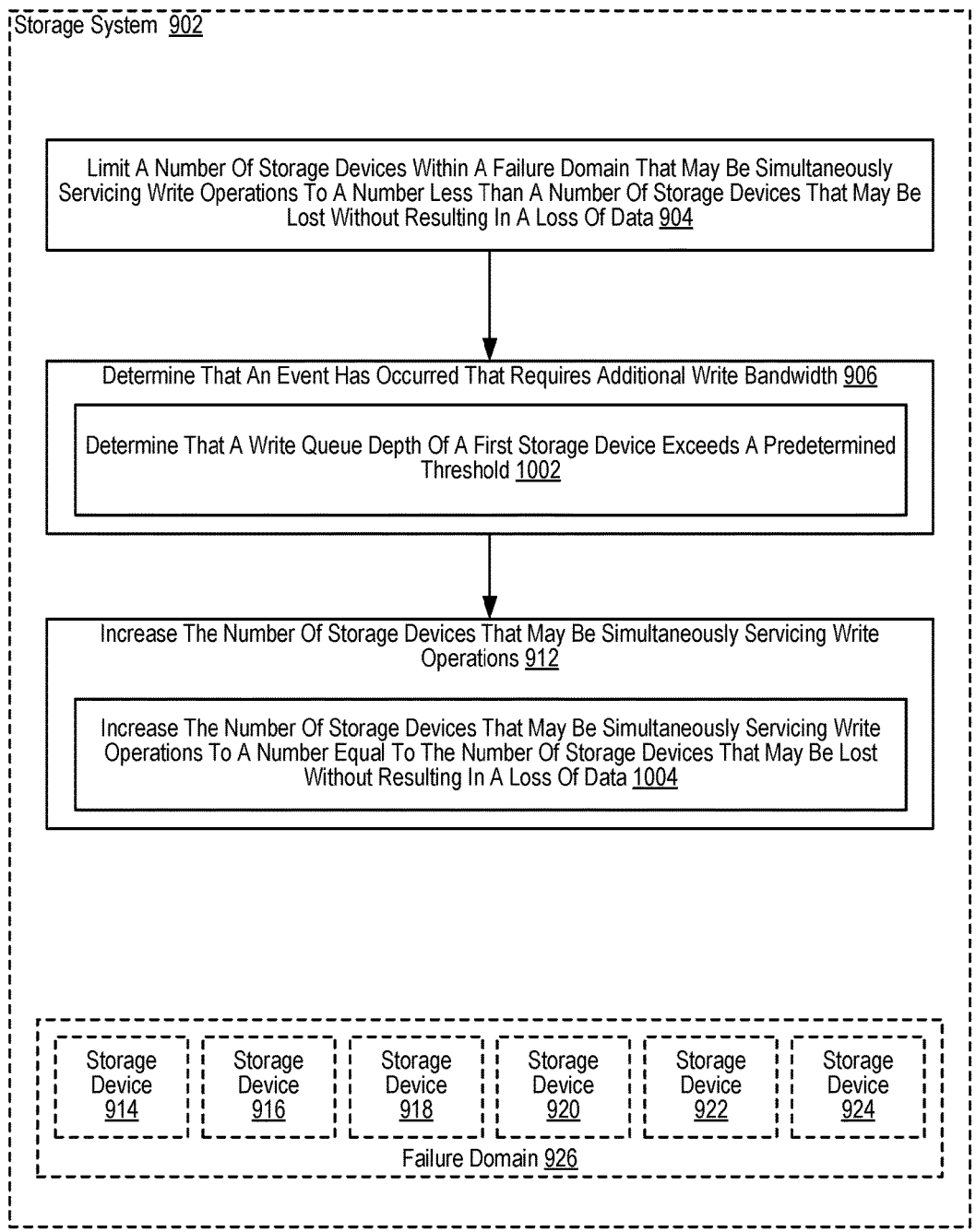
FIG. 10 sets forth a flow chart illustrating another example method of dynamically adjusting a number of storage devices that may be utilized to simultaneously service write operations system that includes a plurality of storage devices according to some embodiments of the present disclosure.

For further explanation, FIG. 10 sets forth a flow chart illustrating a further example method of dynamically adjusting a number of storage devices in a storage system that may be utilized to simultaneously service write operations according to embodiments of the present invention. The method of FIG. 10 is similar to the method of FIG. 9 in that the method of FIG. 10 may also be carried out by a system management module such as the module set forth in FIG. 2 and in a storage system (902) similar to those set forth in FIGS. 1-8. Additionally, the method of FIG. 10 is also similar to the method of FIG. 9 in that the method of FIG. 10 also includes: limiting (904) a number of storage devices within a failure domain that may be simultaneously servicing write operations to a number less than a number of storage devices that may be lost without resulting in a loss of data; determining (906) that an event has occurred that requires additional write bandwidth; and responsive to determining that an event has occurred that requires additional write bandwidth, increasing (912) the number of storage devices that may be simultaneously servicing write operations.

The method of FIG. 10 differs from the method of FIG. 9, however, in that in the method of FIG. 10 determining (904) that an event has occurred that requires additional write bandwidth includes determining (1002) that a write queue depth of a first storage device exceeds a predetermined threshold. The first storage device, when determining the write queue depth, is a non-writing storage device. That is, the first storage device is waiting to write, while another storage device is writing in accordance with the limit (904) of the number of storage devices that may be servicing write operations. Consider, for example, that one storage device is servicing a write while the limit of storage devices that may be servicing write operations is one. In such an example, another storage device (referred to here as 'the first storage device') is unable to service write operations. As such, any write operations directed to the first, non-writing storage device, are queued.

In some embodiments, each storage device (914-924) includes a queue of write operations. Each queue may be limited to a particular size. When the queue is filled and exceeds a predetermined threshold, the system management module may determine that an event has occurred that requires additional write bandwidth. Consider, for example, that the predetermined threshold is set at 50% of the total queue. When the first storage device's queue fills past 50%, the queue depth has exceeded the predetermined threshold. Readers of skill in the art will recognize that exceeding a predetermined threshold may also be implemented as meeting or exceeding a predetermined threshold.

The method of FIG. 10 also differs from the method of FIG. 9 in that in the method of FIG. 10, increasing (912) the number of storage devices that may be simultaneously servicing write operations includes increasing (1004) the number of storage devices that may be simultaneously servicing write operations to a number equal to the number of storage devices that may be lost without resulting in a loss of data. Said another way, the when the queue depth of one or more non-writing storage devices exceeds a predetermined threshold, the system management module may increase the number of storage devices that may simultaneously service write operations all the way up to and including the number of parity storage devices. Such an increase may be done in an incremental fashion—increasing by one the number from the initial limit (one in some cases) to the number of parity devices in the failure domain.

Once the number of storage devices that may be simultaneously servicing write operations is equal to the number of parity devices in the failure domain, a reconstructive read operation may be performed with the non-writing devices. If, however, a single device fails when the number of simultaneously writing devices is equal to the number of parity devices, a reconstructive cannot be performed. Consider an example with ten devices and two parity devices, when the number of simultaneously writing devices has been increased to two. In such an example eight of the storage devices may be used to perform a reconstructive read operation while the remaining two storage devices perform write operations. If any one of the ten storage devices fail, however, two storage devices will be busy writing and one additional storage device will be unavailable due to failure. As such, only seven of the ten storage devices are available while eight are required to reconstruct the data targeted by the read operation. As such, increasing the number of simultaneously writing storage devices to parity is beneficial to write bandwidth but increases the possibility of additional read latency.

In a similar manner, increasing the number of simultaneously writing storage devices past the number of parity devices in the failure domain is beneficial to write bandwidth but completely removes the ability to perform a reconstructive read. Thus, increasing the number of simultaneously writing storage devices past the number of parity devices may result in increased write bandwidth and increased read latency. As such, in some embodiments, increasing the number of simultaneously writing storage devices past the number of parity devices requires additional or escalating criteria. To that end, FIG. 11 sets forth a flow chart illustrating an additional method of dynamically adjusting a number of storage devices in a storage system that may be utilized to simultaneously service write operations.

Figure 11:
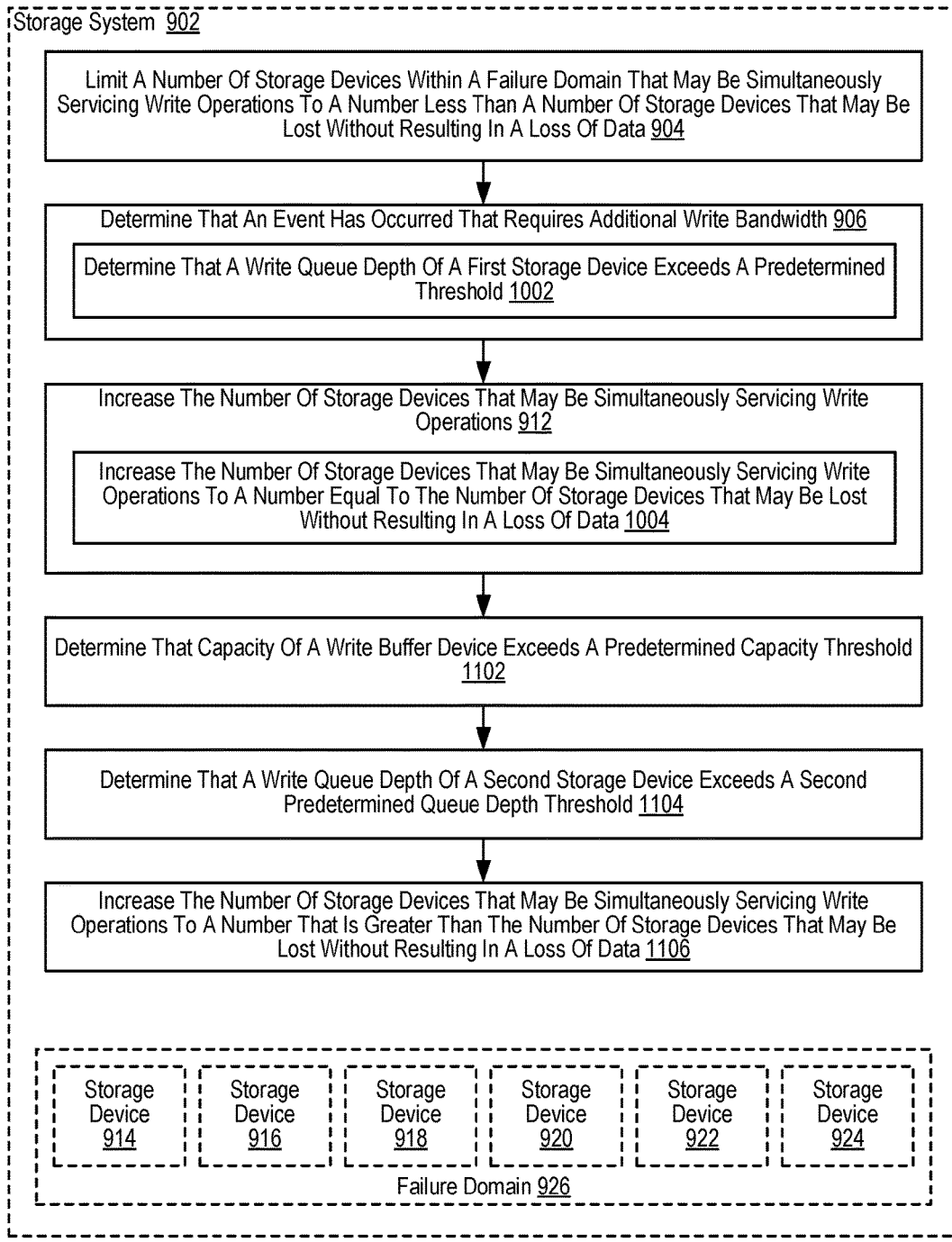
FIG. 11 sets forth a flow chart illustrating another example method of dynamically adjusting a number of storage devices that may be utilized to simultaneously service write operations system that includes a plurality of storage devices according to some embodiments of the present disclosure.

The method of FIG. 11 is similar to the method of FIG. 9 in that the method of FIG. 11 may also be carried out by a system management module such as the module set forth in FIG. 2 and in a storage system (902) similar to those set forth in FIGS. 1-8. Additionally, the method of FIG. 11 is also similar to the method of FIG. 9 in that the method of FIG. 11 also includes: limiting (904) a number of storage devices within a failure domain that may be simultaneously servicing write operations to a number less than a number of storage devices that may be lost without resulting in a loss of data; determining (906) that an event has occurred that requires additional write bandwidth; and responsive to determining that an event has occurred that requires additional write bandwidth, increasing (912) the number of storage devices that may be simultaneously servicing write operations. FIG. 11 also depicts elements set forth in FIG. 10 including: determining (1002) that a write queue depth of a first storage device exceeds a predetermined threshold and increasing (1004) the number of storage devices that may be simultaneously servicing write operations to a number equal to the number of storage devices that may be lost without resulting in a loss of data.

The method of FIG. 11 adds to the method of FIG. 10 in that the method of FIG. 11 also includes determining (1102) that capacity of a write buffer device exceeds a predetermined capacity threshold. The write buffer device in the method of FIG. 11 may be similar to the write buffer devices described above in FIGS. 1-3. Again, as above, the phrase "exceeds a predetermined . . . threshold" may mean both meets a predetermined threshold or exceeds a predetermined threshold depending upon implementation. When the write buffer device exceeds a predetermined capacity threshold, write operations are queued to a point where write latency may increase without mitigation.

The method of FIG. 11 also includes determining (1104) that a write queue depth of a second storage device exceeds a second predetermined queue depth threshold. The second storage device, at the time of the determination (1104) is a non-writing storage device. The second predetermined queue depth threshold may be the same or different queue depth as the first queue depth threshold used to determine (1002) that the write queue depth of the first storage device exceeds the first threshold.

Once the determination is made that the capacity of the write buffer device exceeds a predetermined capacity threshold and that the write queue depth of a second storage devices exceeds a second predetermined queue depth threshold, the method of FIG. 11 continues by increasing (1106) the number of storage devices that may be simultaneously servicing write operations to a number that is greater than the number of storage devices that may be lost without resulting in a loss of data. Here, multiple criteria are satisfied before the system management module increases the number of storage devices that may simultaneously service write operations past the number of parity devices in the write group. Readers of skill in the art will recognize that increasing the number of simultaneously writing storage devices need not necessarily result in the second storage device immediately writing. Instead, any of the storage devices in the failure domain may take the additional writing position. Consider, for example, a failure domain with eight total storage devices and two parity devices. At the time of the determinations (1002 and 1102), storage device A and storage device B are writing, storage device C has a queue depth that exceeds the second predetermined queue depth threshold and is not writing, and the capacity of the write buffer device exceeds the capacity threshold. In such an example, the system management module may increase the number of simultaneously writing drives from two to three. Storage device A and storage device B may continue writing while an additional storage device—storage device C or otherwise—begins servicing write operations. Any writing will reduce the write operation pressure on the write buffer device and increase write bandwidth.

Once the determination is made that the capacity of the write buffer device exceeds a predetermined capacity threshold and that the write queue depth of a second storage devices exceeds a second predetermined queue depth threshold, the method of FIG. 11 continues by increasing (1106) the number of storage devices that may be simultaneously servicing write operations to a number that is greater than the number of storage devices that may be lost without resulting in a loss of data. Here, multiple criteria are satisfied before the system management module increases the number of storage devices that may simultaneously service write operations past the number of parity devices in the write group. Readers of skill in the art will recognize that increasing the number of simultaneously writing storage devices need not necessarily result in the second storage device immediately writing. Instead, any of the storage devices in the failure domain may take the additional writing position. Consider, for example, a failure domain with eight total storage devices and two parity devices. At the time of the determinations (1002 and 1102), storage device A and storage device B are writing, storage device C has a queue depth that exceeds the second predetermined queue depth threshold and is not writing, and the capacity of the write buffer device exceeds the capacity threshold. In such an example, the system management module may increase the number of simultaneously writing drives from two to three. Storage device A and storage device B may continue writing while an additional storage device—storage device C or otherwise—begins servicing write operations. Any writing will reduce the write operation pressure on the write buffer device and increase write bandwidth.

Figure 12:
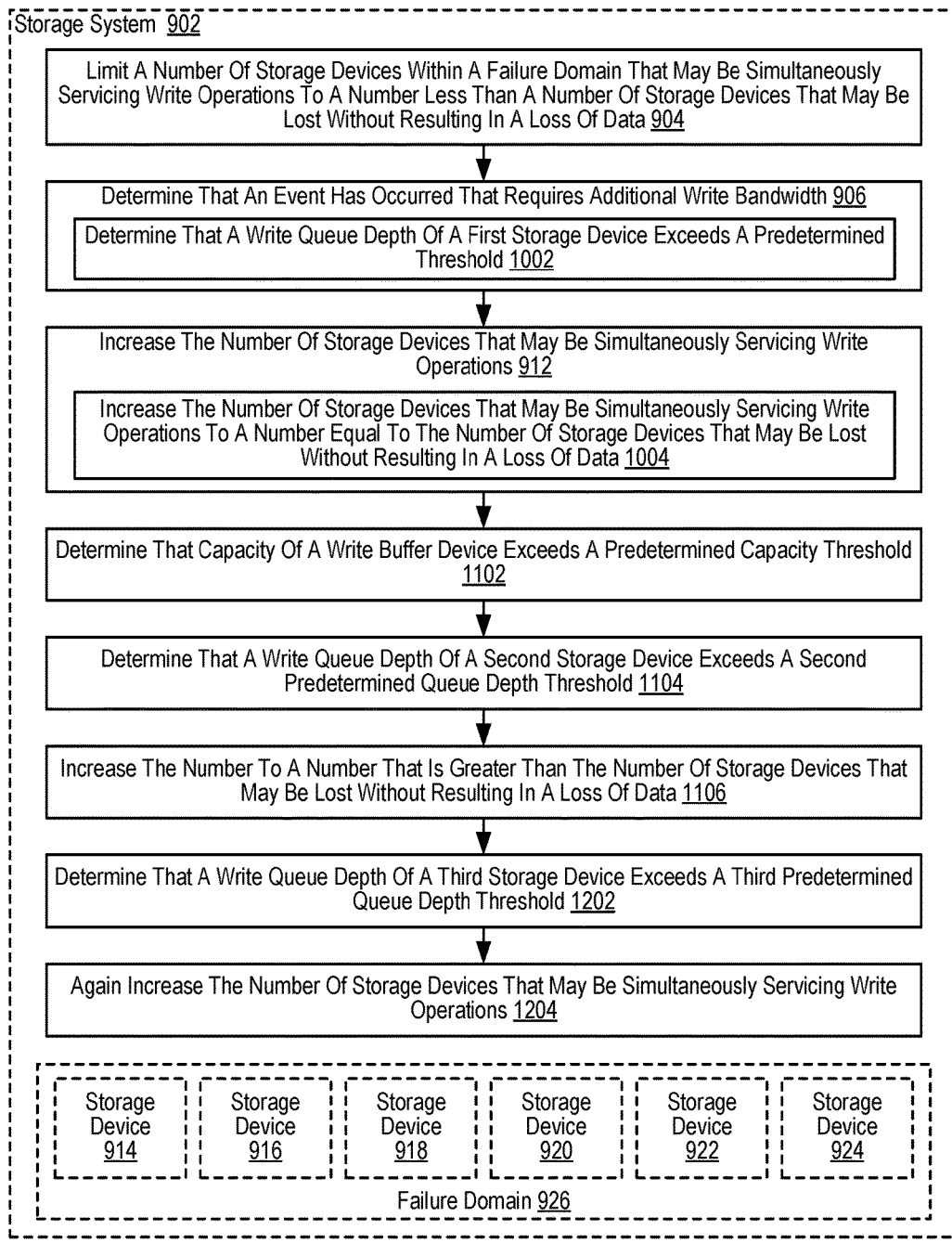
FIG. 12 sets forth a flow chart illustrating another example method of dynamically adjusting a number of storage devices that may be utilized to simultaneously service write operations system that includes a plurality of storage devices according to some embodiments of the present disclosure.

For further explanation, FIG. 12 sets forth a flow chart illustrating another example method of dynamically adjusting a number of storage devices in a storage system that may be utilized to simultaneously service write operations according to embodiments of the present invention. The method of FIG. 12 is similar to the method of FIG. 9 in that the method of FIG. 12 may also be carried out by a system management module such as the module set forth in FIG. 2 and in a storage system (902) similar to those set forth in FIGS. 1-8. Additionally, the method of FIG. 12 is also similar to the method of FIG. 9 in that the method of FIG. 12 also includes: limiting (904) a number of storage devices within a failure domain that may be simultaneously servicing write operations to a number less than a number of storage devices that may be lost without resulting in a loss of data; determining (906) that an event has occurred that requires additional write bandwidth; and responsive to determining that an event has occurred that requires additional write bandwidth, increasing (912) the number of storage devices that may be simultaneously servicing write operations. FIG. 12 also depicts elements set forth in FIGS. 10 and 11 including: determining (1002) that a write queue depth of a first storage device exceeds a predetermined threshold; increasing (1004) the number of storage devices that may be simultaneously servicing write operations to a number equal to the number of storage devices that may be lost without resulting in a loss of data; determining (1102) that capacity of a write buffer device exceeds a predetermined capacity threshold; determining (1104) that a write queue depth of a second storage device exceeds a second predetermined queue depth threshold, wherein the second storage device is a non-writing storage device when determining the write queue depth for the second storage device; and increasing (1106) the number of storage devices that may be simultaneously servicing write operations to a number that is greater than the number of storage devices that may be lost without resulting in a loss of data.

The method of FIG. 12 depicts additional elements to that of FIG. 11 including determining (1202) that a write queue depth of a third storage device exceeds a third predetermined queue depth threshold, wherein the third storage device is a non-writing storage device when determining the write queue depth for the third storage device and again increasing (1204) the number of storage devices that may be simultaneously servicing write operations. Once the number of storage devices that may be simultaneously servicing write operations is increased past the number of parity devices for a failure domain, the number may again be increased (1204) when the write queue depth of another ('the third') storage device exceeds a third predetermined queue depth threshold. The third predetermined queue depth threshold may be the same or different than first and second predetermined queue depth threshold depending upon implementation. Such additional increases (1204) may continue for each different storage device in the failure domain as write queue depth's exceed (or meet depending on implementation) thresholds as long as the capacity of the write buffer device exceeds (or meets depending on implementation) the capacity threshold. In this way, write bandwidth may be dynamically increased on-demand.

Figure 13:
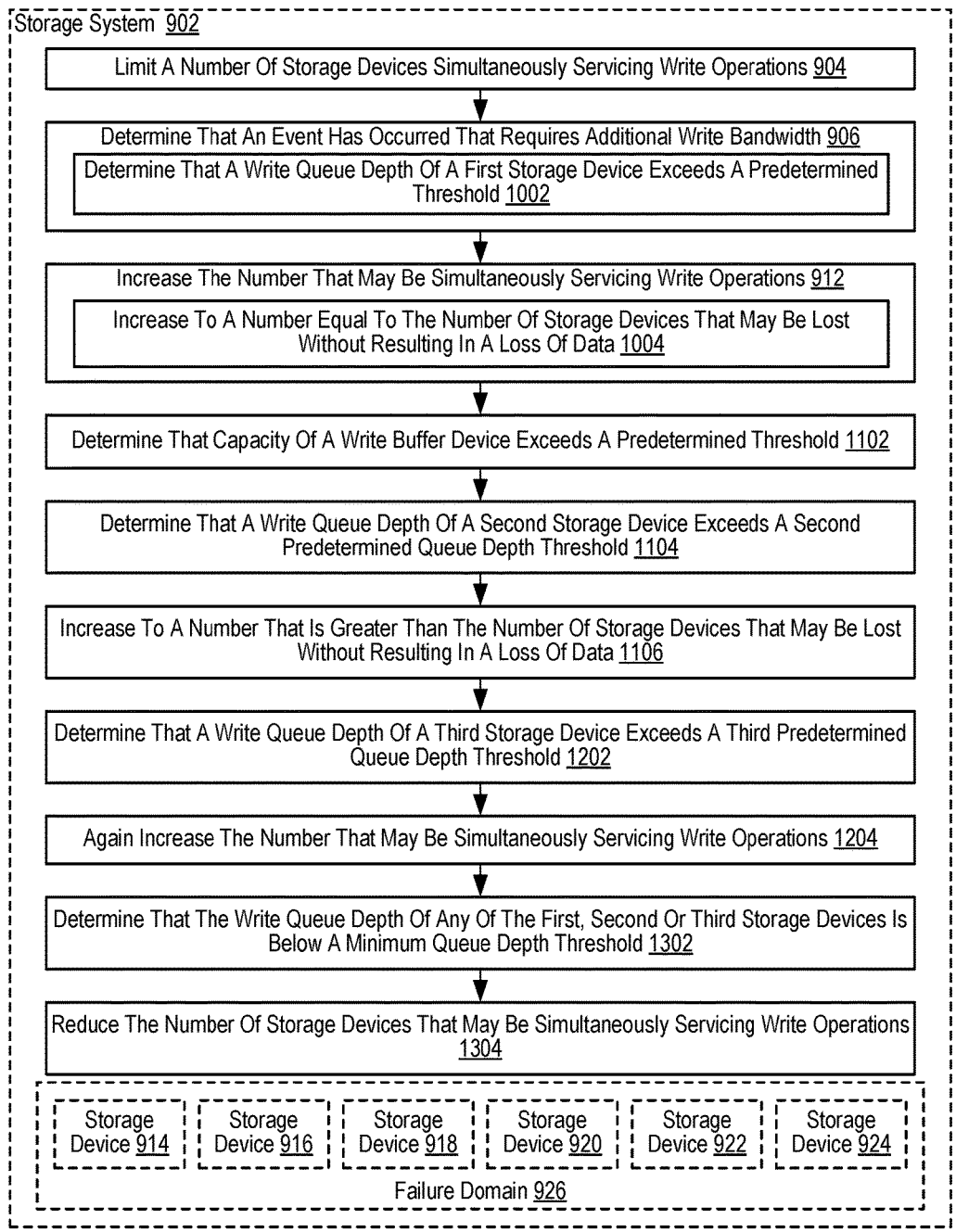
FIG. 13 sets forth a flow chart illustrating another example method of dynamically adjusting a number of storage devices that may be utilized to simultaneously service write operations system that includes a plurality of storage devices according to some embodiments of the present disclosure.

For further explanation, FIG. 13 sets forth a flow chart illustrating another example method of dynamically adjusting a number of storage devices in a storage system that may be utilized to simultaneously service write operations according to embodiments of the present invention. The method of FIG. 13 is similar to the method of FIG. 9 in that the method of FIG. 13 may also be carried out by a system management module such as the module set forth in FIG. 2 and in a storage system (902) similar to those set forth in FIGS. 1-8. Additionally, the method of FIG. 13 is also similar to the method of FIG. 9 in that the method of FIG. 13 also includes: limiting (904) a number of storage devices within a failure domain that may be simultaneously servicing write operations to a number less than a number of storage devices that may be lost without resulting in a loss of data; determining (906) that an event has occurred that requires additional write bandwidth; and responsive to determining that an event has occurred that requires additional write bandwidth, increasing (912) the number of storage devices that may be simultaneously servicing write operations. FIG. 13 also depicts elements set forth in FIGS. 10, 11, and 12 including: determining (1002) that a write queue depth of a first storage device exceeds a predetermined threshold; increasing (1004) the number of storage devices that may be simultaneously servicing write operations to a number equal to the number of storage devices that may be lost without resulting in a loss of data; determining (1102) that capacity of a write buffer device exceeds a predetermined capacity threshold; determining (1104) that a write queue depth of a second storage device exceeds a second predetermined queue depth threshold, wherein the second storage device is a non-writing storage device when determining the write queue depth for the second storage device; increasing (1106) the number of storage devices that may be simultaneously servicing write operations to a number that is greater than the number of storage devices that may be lost without resulting in a loss of data; determining (1202) that a write queue depth of a third storage device exceeds a third predetermined queue depth threshold; and again increasing (1204) the number of storage devices that may be simultaneously servicing write operations.

The method of FIG. 13 sets forth elements additional to FIG. 12, including determining (1302) that the write queue depth of any of the first, second or third storage devices is below a minimum queue depth threshold and reducing (1304) the number of storage devices that may be simultaneously servicing write operations. The 'minimum queue depth threshold' as the term is used here may be implemented in a variety of ways including as a queue depth lower than the queue depth threshold used to increase the write bandwidth or as a queue depth that equals the queue depth threshold used to increase the write bandwidth. In this way, when the write queue depth of any of the first, second or third storage devices falls below the minimum predetermined queue depth threshold, the additional write bandwidth may be reduced. In a storage system, for example, having two parity devices and in which the number of simultaneously writing devices has been increased from one to five, when the queue depth of any one of the five devices causing the increase in write bandwidth falls below the minimum threshold, the number of simultaneously writing devices may be reduced by one. Reducing the write bandwidth results in the increase of the probability of reduced read latency. In this way, not only may the write bandwidth be expanded dynamically, on-demand, but the write bandwidth may also be dynamically reduced when demand is reduced.

Figure 14:
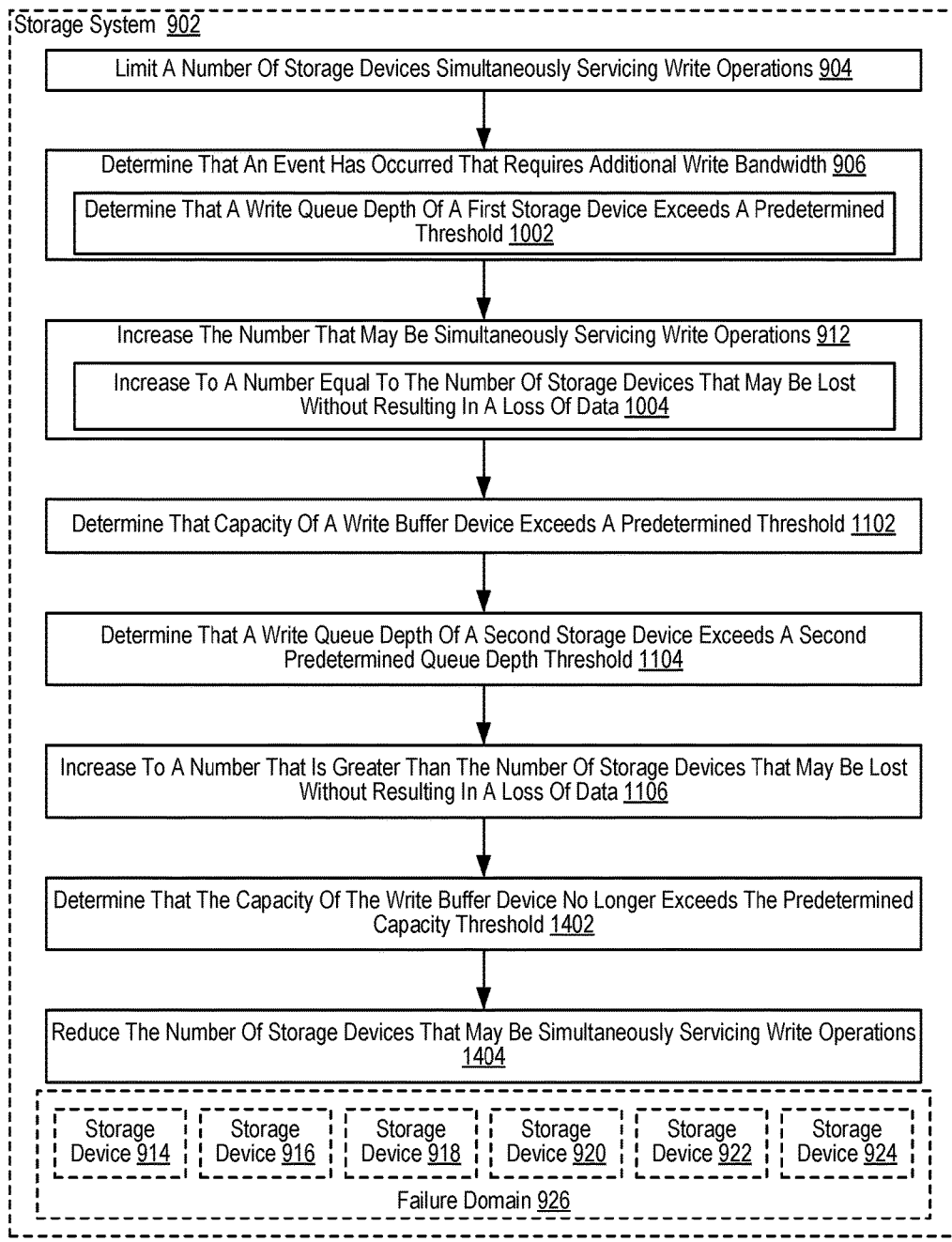
FIG. 14 sets forth a flow chart illustrating another example method of dynamically adjusting a number of storage devices that may be utilized to simultaneously service write operations system that includes a plurality of storage devices according to some embodiments of the present disclosure.

For further explanation, FIG. 14 sets forth a flow chart illustrating another example method of dynamically adjusting a number of storage devices in a storage system that may be utilized to simultaneously service write operations according to embodiments of the present invention. The method of FIG. 14 is similar to the method of FIG. 9 in that the method of FIG. 14 may also be carried out by a system management module such as the module set forth in FIG. 2 and in a storage system (902) similar to those set forth in FIGS. 1-8. Additionally, the method of FIG. 14 is also similar to the method of FIG. 9 in that the method of FIG. 14 also includes: limiting (904) a number of storage devices within a failure domain that may be simultaneously servicing write operations to a number less than a number of storage devices that may be lost without resulting in a loss of data; determining (906) that an event has occurred that requires additional write bandwidth; and responsive to determining that an event has occurred that requires additional write bandwidth, increasing (912) the number of storage devices that may be simultaneously servicing write operations. FIG. 14 also depicts elements set forth in FIGS. 10 and 11 including: determining (1002) that a write queue depth of a first storage device exceeds a predetermined threshold; increasing (1004) the number of storage devices that may be simultaneously servicing write operations to a number equal to the number of storage devices that may be lost without resulting in a loss of data; determining (1102) that capacity of a write buffer device exceeds a predetermined capacity threshold; determining (1104) that a write queue depth of a second storage device exceeds a second predetermined queue depth threshold, wherein the second storage device is a non-writing storage device when determining the write queue depth for the second storage device; and increasing (1106) the number of storage devices that may be simultaneously servicing write operations to a number that is greater than the number of storage devices that may be lost without resulting in a loss of data.

The method of FIG. 14 sets forth elements additional to FIG. 11, including determining (1404) that the capacity of the write buffer device no longer exceeds the predetermined capacity threshold and reducing (1404) the number of storage devices that may be simultaneously servicing write operations. Like the method of FIG. 13 above, when the write bandwidth demand reduces, the method of FIG. 14 provides a means by which to reduce the write bandwidth provided. Here, when the write buffer device no longer exceeds the predetermined capacity threshold—representing a manageable amount of write operations across the entire failure domain or said, another way, a management write bandwidth demand—the system management module may reduce (1404) the number of storage devices that are simultaneously writing. Such a reduction may be carried out in a variety of manners. In some embodiments, when the write buffer device capacity falls below (or equal to in some implementations) the capacity threshold, the system management module may reduce (1404) the number of simultaneously writing devices to the number of parity devices in the failure domain. In some embodiments, when the write buffer device capacity falls below the capacity threshold, the system management module may reduce (1404) the number of simultaneously writing devices by one, regardless of the number of parity devices in the failure domain. In some embodiments, when the write buffer device capacity falls below the capacity threshold, the system management module may reduce (1404) the number of simultaneously writing devices to one, effectively re-initializing the available write bandwidth. Readers of skill in the art will recognize that the operations set forth in FIG. 14 to reduce (1404) the number of storage devices that may be simultaneously servicing write operations may be performed in conjunction with the operations set forth in FIG. 13 to do the same. That is, in some implementations the number of simultaneously writing storage devices may be reduced either in response to determining that a write queue depth of one of the storage devices previously causing an increase write bandwidth has fallen below the minimum queue depth threshold or in response to determining that the capacity of the write buffer no longer exceeds the predetermined threshold capacity.

Figure 15:
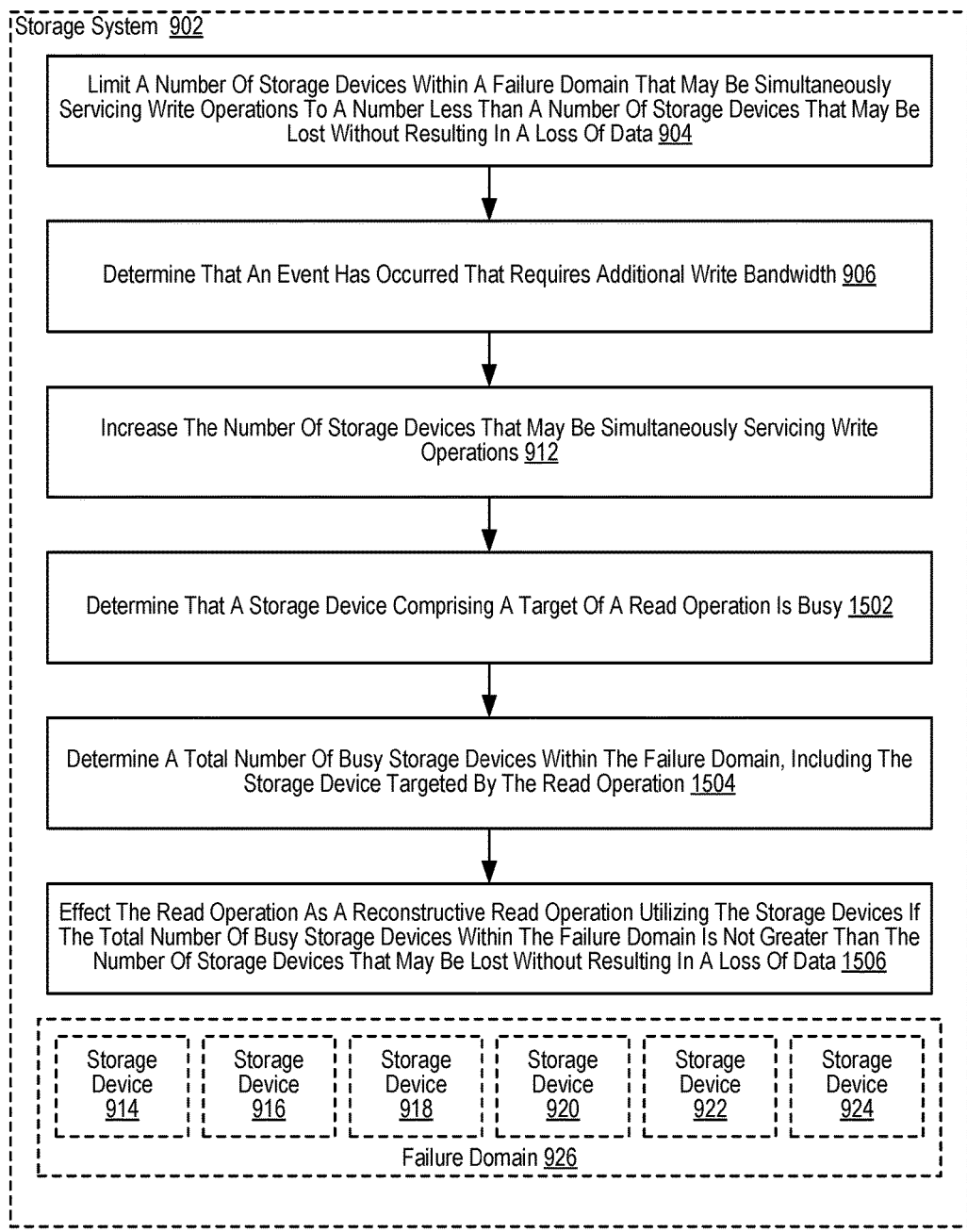
FIG. 15 sets forth a flow chart illustrating another example method of dynamically adjusting a number of storage devices that may be utilized to simultaneously service write operations system that includes a plurality of storage devices according to some embodiments of the present disclosure.

FIGS. 9-14 generally set forth various methods of dynamic write bandwidth adjustment. Read bandwidth may also be dynamically adjusted. For further explanation, therefore, FIG. 15 sets forth a flow chart illustrating a further example method of dynamically adjusting a number of storage devices in a storage system that may be utilized to simultaneously service write operations according to embodiments of the present invention which also includes dynamically adjusting read bandwidth. The method of FIG. 15 is similar to the method of FIG. 9 in that the method of FIG. 15 may also be carried out by a system management module such as the module set forth in FIG. 2 and in a storage system (902) similar to those set forth in FIGS. 1-8. Additionally, the method of FIG. 15 is also similar to the method of FIG. 9 in that the method of FIG. 15 also includes: limiting (904) a number of storage devices within a failure domain that may be simultaneously servicing write operations to a number less than a number of storage devices that may be lost without resulting in a loss of data; determining (906) that an event has occurred that requires additional write bandwidth; and responsive to determining that an event has occurred that requires additional write bandwidth, increasing (912) the number of storage devices that may be simultaneously servicing write operations.

The method of FIG. 15 includes determining (1502) that a storage device comprising a target of a read operation is busy. A storage device may be considered 'busy' for a variety of reasons, some of which are set forth in FIGS. 16 and 17. Some example reasons for a storage device to be considered 'busy' include that the storage device has failed, the communication with the storage device has failed, that the storage device has been removed from the storage system, that the storage device is servicing a write operation, and so on as will occur to readers of skill in the art. A read operation 'targets' a memory location within a storage device. If the storage device is 'busy' the read operation cannot currently be serviced by that storage device. Another option, if available, may be to perform the read through a reconstructive read, using other storage devices in the failure domain to reconstruct the data stored at the targeted read location.

The method of FIG. 15 also includes determining (1504) a total number of busy storage devices within the failure domain, including the storage device targeted by the read operation. Consider, for example, a failure domain of ten storage devices with two parity devices. Consider also that the target of the read operation is presently writing (busy) as is one additional storage device is currently writing (busy). In this example, a total of two devices are busy including the storage device targeted by the read operation.

The method of FIG. 15 continues by effecting (1506) the read operation as a reconstructive read operation utilizing the storage devices that are not busy, if the total number of busy storage devices within the failure domain is not greater than the number of storage devices that may be lost without resulting in a loss of data. Continuing with the example above, the total number of busy devices (two) equals the total number parity devices (two) and thus, the system management module may direct the storage system to perform the read operation as a reconstructive read using the eight non-busy storage devices. If, however, the number of busy storage devices had been three (including the target of the read), the system management module would not direct the storage system to perform the read as a reconstructive read.

Figure 16:
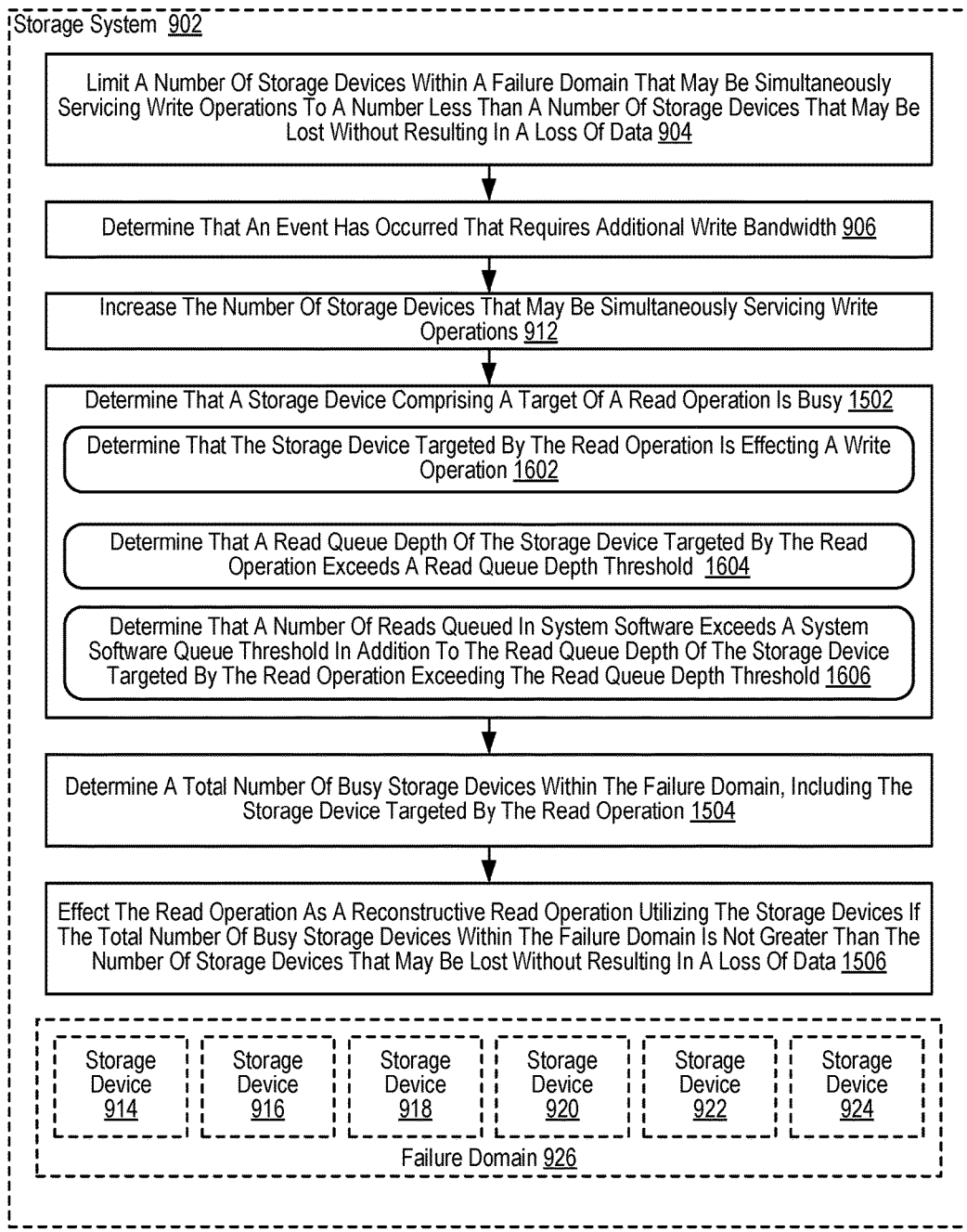
FIG. 16 sets forth a flow chart illustrating another example method of dynamically adjusting a number of storage devices that may be utilized to simultaneously service write operations system that includes a plurality of storage devices according to some embodiments of the present disclosure.

For further explanation, FIG. 16 sets forth a flow chart illustrating another example method of dynamically adjusting a number of storage devices in a storage system that may be utilized to simultaneously service write operations according to embodiments of the present invention which also includes dynamically adjusting read bandwidth. The method of FIG. 16 is similar to the method of FIG. 9 in that the method of FIG. 16 may also be carried out by a system management module such as the module set forth in FIG. 2 and in a storage system (902) similar to those set forth in FIGS. 1-8. Additionally, the method of FIG. 16 is also similar to the method of FIG. 9 in that the method of FIG. 16 also includes: limiting (904) a number of storage devices within a failure domain that may be simultaneously servicing write operations to a number less than a number of storage devices that may be lost without resulting in a loss of data; determining (906) that an event has occurred that requires additional write bandwidth; and responsive to determining that an event has occurred that requires additional write bandwidth, increasing (912) the number of storage devices that may be simultaneously servicing write operations. The method of FIG. 16 also includes elements of the method of FIG. 15 including: determining (1502) that a storage device comprising a target of a read operation is busy; determining (1504) a total number of busy storage devices within the failure domain, including the storage device targeted by the read operation; and, if the total number of busy storage devices within the failure domain is not greater than the number of storage devices that may be lost without resulting in a loss of data, effecting (1506) the read operation as a reconstructive read operation utilizing the storage devices that are not busy.

The method of FIG. 16 includes several different methods for determining (1502) that a storage device comprising a target of a read operation is busy. In the method of FIG. 16, determining (1502) that a storage device comprising the target of the read operation is busy may be carried out by: determining (1602) that the storage device targeted by the read operation is effecting a write operation; determining (1604) that a read queue depth of the storage device targeted by the read operation exceeds a read queue depth threshold, or determining (1606) that a number of reads queued in system software exceeds a system software queue threshold in addition to the read queue depth of the storage device targeted by the read operation exceeding the read queue depth threshold. Each storage device may maintain a read queue on the storage device. When the storage device read queue fills to a particular threshold, the drive may be considered busy. In some embodiments, the system software also includes a read queue which may roughly approximate or match the read queue of the storage device itself. Thus when the read queue in software exceeds a particular threshold, the storage device may also be considered busy.

Figure 17:
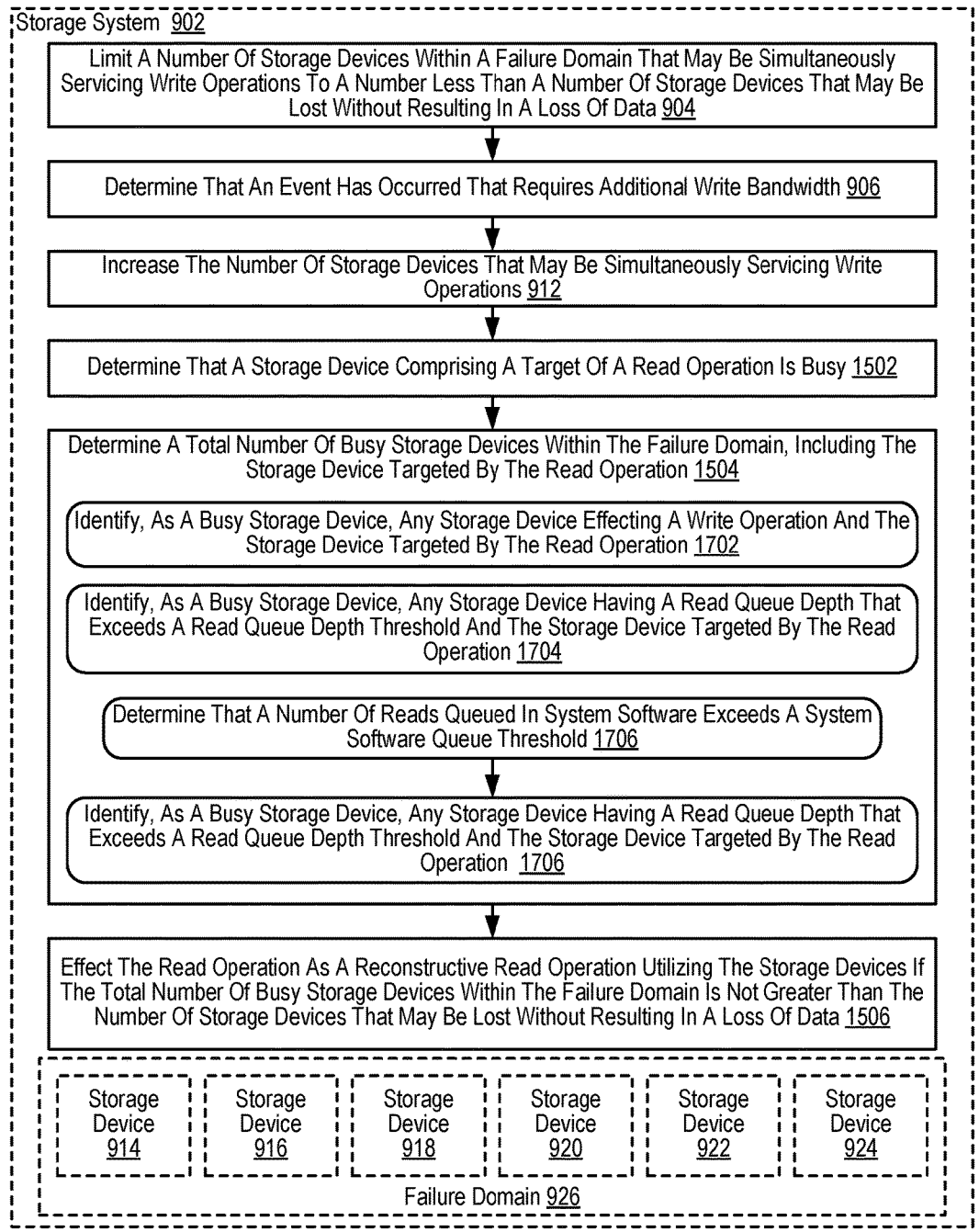
FIG. 17 sets forth a flow chart illustrating another example method of dynamically adjusting a number of storage devices that may be utilized to simultaneously service write operations system that includes a plurality of storage devices according to some embodiments of the present disclosure.

For further explanation, FIG. 17 sets forth a flow chart illustrating another example method of dynamically adjusting a number of storage devices in a storage system that may be utilized to simultaneously service write operations according to embodiments of the present invention which also includes dynamically adjusting read bandwidth. The method of FIG. 17 is similar to the method of FIG. 9 in that the method of FIG. 17 may also be carried out by a system management module such as the module set forth in FIG. 2 and in a storage system (902) similar to those set forth in FIGS. 1-8. Additionally, the method of FIG. 17 is also similar to the method of FIG. 9 in that the method of FIG. 17 also includes: limiting (904) a number of storage devices within a failure domain that may be simultaneously servicing write operations to a number less than a number of storage devices that may be lost without resulting in a loss of data; determining (906) that an event has occurred that requires additional write bandwidth; and responsive to determining that an event has occurred that requires additional write bandwidth, increasing (912) the number of storage devices that may be simultaneously servicing write operations. The method of FIG. 17 also includes elements of the method of FIG. 15 including: determining (1502) that a storage device comprising a target of a read operation is busy; determining (1504) a total number of busy storage devices within the failure domain, including the storage device targeted by the read operation; and, if the total number of busy storage devices within the failure domain is not greater than the number of storage devices that may be lost without resulting in a loss of data, effecting (1506) the read operation as a reconstructive read operation utilizing the storage devices that are not busy.

The method of FIG. 17 includes several different methods for determining (1504) a total number of busy storage devices. In the method of FIG. 17, determining (1504) a totally number of busy storage devices may be carried out in a fashion similar to the elements set forth in FIG. 16 including: identifying (1702), as a busy storage device, any storage device effecting a write operation and the storage device targeted by the read operation; identifying (1704), as a busy storage device, any storage device having a read queue depth that exceeds a read queue depth threshold and the storage device targeted by the read operation; and determining (1706) that a number of reads queued in system software exceeds a system software queue threshold and identifying (1708), as a busy storage device, any storage device having a read queue depth that exceeds a read queue depth threshold and the storage device targeted by the read operation For further explanation, FIG. 18 sets forth a flow chart illustrating an example method of administering read operations in a storage system that includes a number of storage devices according to embodiments of the present invention. The method of FIG. 18 may be carried out by a system management module such as the module set forth in FIG. 2 and in a storage system (902) similar to those set forth in FIGS. 1-8.

Figure 18:
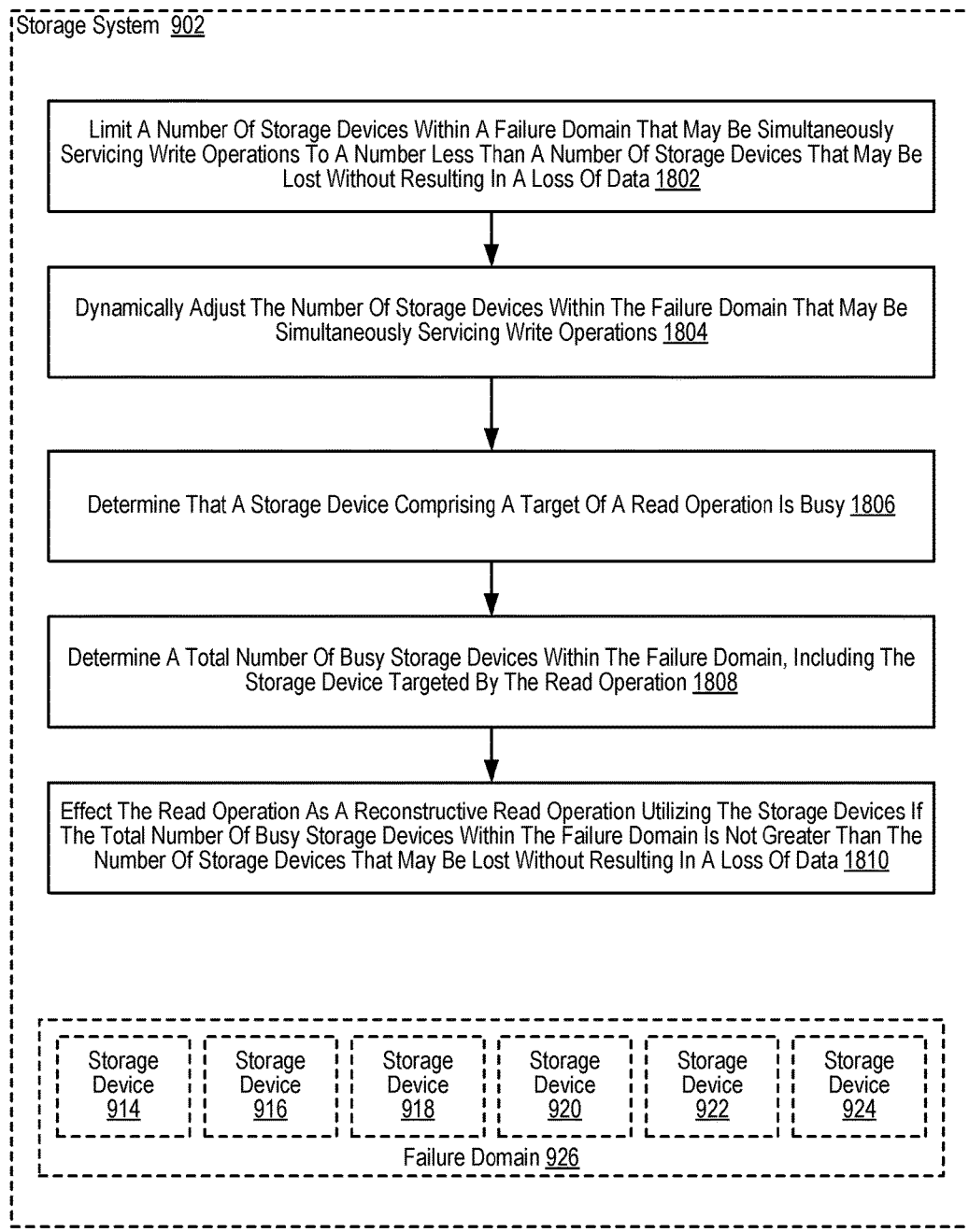
FIG. 18 sets forth a flow chart illustrating an example method of administering read operations in a storage system that includes a number of storage devices according to embodiments of the present invention.

The method of FIG. 18 includes limiting (1802) a number of storage devices within a failure domain that may be simultaneously servicing write operations to a number less than a number of storage devices that may be lost without resulting in a loss of data. Such a limit (1802) may be carried out as described above with respect to FIGS. 9-17.

The method of FIG. 18 also includes dynamically adjusting (1804) the number of storage devices within the failure domain that may be simultaneously servicing write operations. Dynamically adjusting (1804) the number of storage devices within the failure domain may include increasing the number of storage devices that may be simultaneously servicing write operations upon a determination of an event occurrence that requires additional write bandwidth (as described above) and reducing the number of storage devices when write bandwidth requirements are reduced (as described above). That is the number of devices allowed to simultaneously service write operations may vary over time—sometimes less than the number of parity devices in a failure domain, sometimes greater.

To that end, the method of FIG. 18 also includes determining (1806) that a storage device comprising a target of a read operation is busy. In some embodiments, as set forth above, determining (1806) that a storage device is busy may include determining that the storage device is servicing a write operation, determining that a read queue on the storage device is above a predetermined threshold, determining that a read queue for the storage device in system software exceeds a predetermined threshold, and so on.

The method of FIG. 18 also includes determining (1808) a total number of busy storage devices within the failure domain, including the storage device targeted by the read operation. As above, determining a total number of busy storage devices may include identifying, as a busy storage device, any device that is servicing write operations, has a read queue filled beyond a predetermined threshold, has a read queue in system software that is filled beyond a predetermined threshold, and so on.

If the total number of busy storage devices within the failure domain is not greater than the number of storage devices that may be lost without resulting in a loss of data, the method of FIG. 18 continues by effecting (1810) the read operation as a reconstructive read operation utilizing the storage devices that are not busy. That is, if number of busy devices (including those that are allowed to simultaneously service a write operation) is equal to or less than the number of parity devices for a particular failure domain, a reconstructive read operation may be performed. If, however, the number of busy devices in the failure domain is greater than the number of parity devices for the failure domain, the reconstructive read operation cannot be performed.

Figure 19:
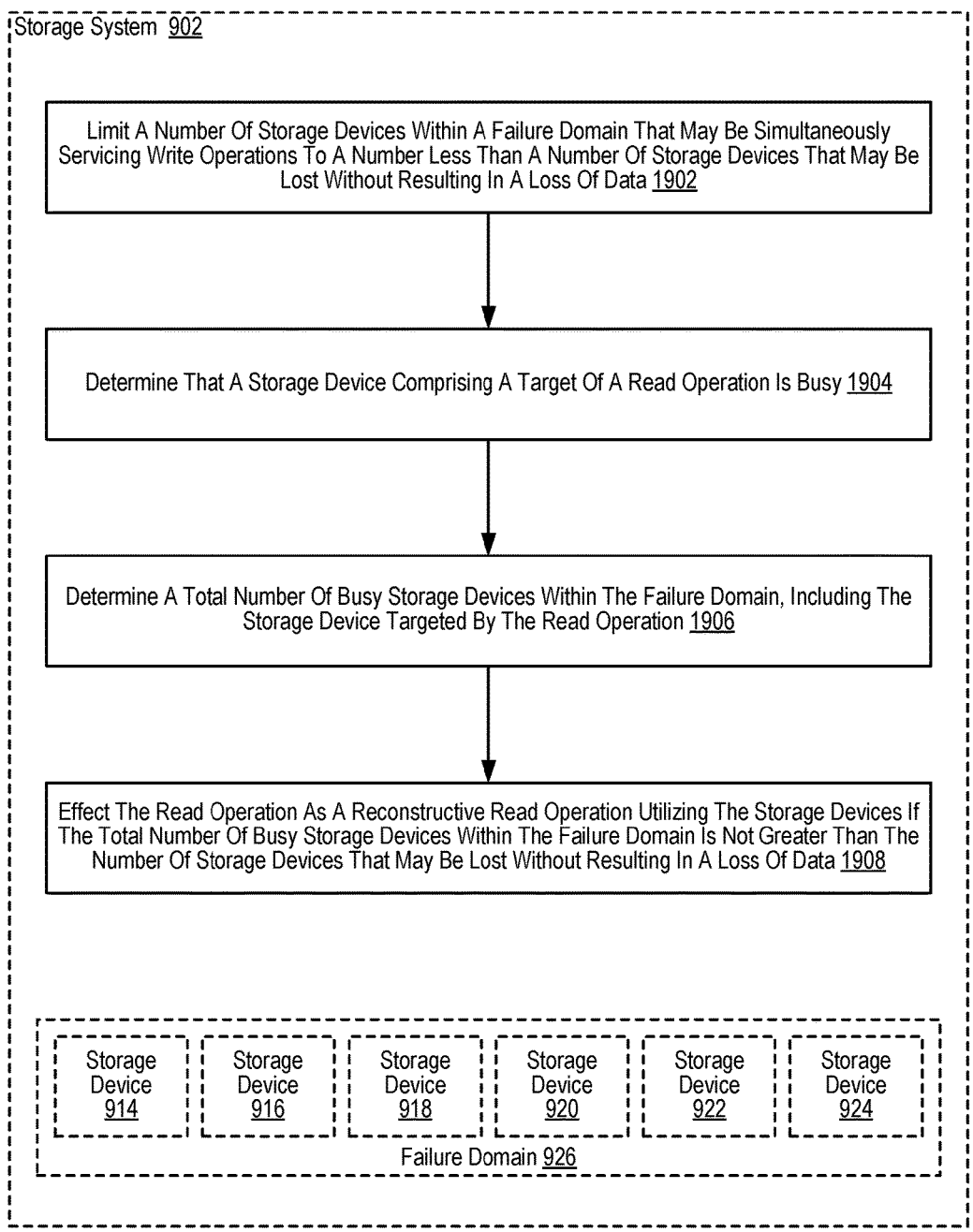
FIG. 19 sets forth a flow chart illustrating another example method of administering read operations in a storage system that includes a number of storage devices according to embodiments of the present invention.

For further explanation, FIG. 19 sets forth a flow chart illustrating another example method of administering read operations in a storage system that includes a number of storage devices according to embodiments of the present invention. The method of FIG. 19 may be carried out by a system management module such as the module set forth in FIG. 2 and in a storage system (902) similar to those set forth in FIGS. 1-8.

The method of FIG. 19 is similar to the method of FIG. 18 in that the method of FIG. 19 includes: limiting (1902) a number of storage devices within a failure domain that may be simultaneously servicing write operations to a number less than a number of storage devices that may be lost without resulting in a loss of data; determining (1904) that a storage device comprising a target of a read operation is busy; determining (1906) a total number of busy storage devices within the failure domain, including the storage device targeted by the read operation; and if the total number of busy storage devices within the failure domain is not greater than the number of storage devices that may be lost without resulting in a loss of data, effecting (1908) the read operation as a reconstructive read operation utilizing the storage devices that are not busy.

FIG. 19 differs from FIG. 18 in that the method of FIG. 18 does not include dynamically adjusting (1804) the number of storage devices within the failure domain that may be simultaneously servicing write operations. The method of FIG. 19 may or may not include such dynamic adjustment simultaneously writing storage devices. As mentioned above, a storage device may be considered 'busy' for the purposes of the reconstructive read determination process set forth in the method of FIG. 19 for a number of a reasons including that a storage device is writing, that the storage device read queue is filled beyond a threshold, that a read queue for the storage device in system software is filled beyond a threshold and so on. Therefore, regardless of whether the number of devices allowed to simultaneously service write operations is dynamically adjusted, the system management module may carry out the process of determining whether to perform a reconstructive read as set forth in FIG. 18.

Readers will appreciate that although the example methods described above are depicted in a way where a series of steps occurs in a particular order, no particular ordering of the steps is required unless explicitly stated. Example embodiments of the present disclosure are described largely in the context of a fully functional computer system for dynamically adjusting a number of storage devices that may be utilized to simultaneously service write operations. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to some embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of dynamically adjusting a number of storage devices in a storage system that may be utilized to simultaneously service write operations, the method comprising:
limiting a number of storage devices within a failure domain that may be simultaneously servicing write operations to a number less than a number of storage devices that may be lost without resulting in a loss of data;
determining that an event has occurred that requires additional write bandwidth; and
responsive to determining that an event has occurred that requires additional write bandwidth, increasing the number of storage devices that may be simultaneously servicing write operations.

2. The method of claim 1 wherein:
determining that an event has occurred that requires additional write bandwidth further comprises determining that a write queue depth of a first storage device exceeds a predetermined threshold, wherein the first storage device is a non-writing storage device when determining the write queue depth for the first storage device; and
increasing the number of storage devices that may be simultaneously servicing write operations further comprises increasing the number of storage devices that may be simultaneously servicing write operations to a number equal to the number of storage devices that may be lost without resulting in a loss of data.

3. The method of claim 2 further comprising:
determining that capacity of a write buffer device exceeds a predetermined capacity threshold;
determining that a write queue depth of a second storage device exceeds a second predetermined queue depth threshold, wherein the second storage device is a non-writing storage device when determining the write queue depth for the second storage device; and
increasing the number of storage devices that may be simultaneously servicing write operations to a number that is greater than the number of storage devices that may be lost without resulting in a loss of data.

4. The method of claim 3 further comprising:
determining that a write queue depth of a third storage device exceeds a third predetermined queue depth threshold, wherein the third storage device is a non-writing storage device when determining the write queue depth for the third storage device; and
again increasing the number of storage devices that may be simultaneously servicing write operations.

5. The method of claim 4 further comprising:
determining that the write queue depth of any of the first, second or third storage devices is below a minimum queue depth threshold; and
reducing the number of storage devices that may be simultaneously servicing write operations.

6. The method of claim 3 further comprising:
determining that the capacity of the write buffer device no longer exceeds the predetermined capacity threshold; and
reducing the number of storage devices that may be simultaneously servicing write operations.

7. The method of claim 1 further comprising:
determining that a storage device comprising a target of a read operation is busy;
determining a total number of busy storage devices within the failure domain, including the storage device targeted by the read operation; and
if the total number of busy storage devices within the failure domain is not greater than the number of storage devices that may be lost without resulting in a loss of data, effecting the read operation as a reconstructive read operation utilizing the storage devices that are not busy.

8. The method of claim 7 wherein determining that a storage device comprising a target of a read operation is busy further comprises determining that the storage device targeted by the read operation is effecting a write operation.

9. The method of claim 7 wherein determining that a storage device comprising a target of a read operation is busy further comprises determining that a read queue depth of the storage device targeted by the read operation exceeds a read queue depth threshold.

10. The method of claim 7 wherein determining that a storage device comprising a target of a read operation is busy further comprises determining that a number of reads queued in system software exceeds a system software queue threshold in addition to the read queue depth of the storage device targeted by the read operation exceeding the read queue depth threshold.

11. The method of claim 7 wherein determining a total number of busy storage devices further comprises identifying, as a busy storage device, any storage device effecting a write operation and the storage device targeted by the read operation.

12. The method of claim 7 wherein determining a total number of busy storage devices further comprises identifying, as a busy storage device, any storage device having a read queue depth that exceeds a read queue depth threshold and the storage device targeted by the read operation.

13. The method of claim 7 wherein determining a total number of busy storage devices further comprises determining that a number of reads queued in system software exceeds a system software queue threshold and identifying, as a busy storage device, any storage device having a read queue depth that exceeds a read queue depth threshold and the storage device targeted by the read operation.

14. An apparatus for dynamically adjusting a number of storage devices in a storage system that may be utilized to simultaneously service write operations, the apparatus comprising a computer processor and a computer memory, the computer memory including computer program instructions that, when executed by the computer processor, cause the apparatus to carry out the steps of:
   limiting a number of storage devices within a failure domain that may be simultaneously servicing write operations to a number less than a number of storage devices that may be lost without resulting in a loss of data;
   determining that an event has occurred that requires additional write bandwidth; and
   responsive to determining that an event has occurred that requires additional write bandwidth, increasing the number of storage devices that may be simultaneously servicing write operations.

15. The apparatus of claim 14 wherein:
   determining that an event has occurred that requires additional write bandwidth further comprises determining that a write queue depth of a first storage device exceeds a predetermined threshold, wherein the first storage device is a non-writing storage device when determining the write queue depth for the second storage device; and
   increasing the number of storage devices that may be simultaneously servicing write operations further comprises increasing the number of storage devices that may be simultaneously servicing write operations to a number equal to the number of storage devices that may be lost without resulting in a loss of data.

16. The apparatus of claim 15 further comprising computer program instructions that, when executed by the computer processor, cause the apparatus to carry out the steps of:
   determining that capacity of a write buffer device exceeds a predetermined capacity threshold;
   determining that a write queue depth of a second storage device exceeds a second predetermined queue depth threshold, wherein the second storage device is a non-writing storage device when determining the write queue depth for the second storage device; and
   increasing the number of storage devices that may be simultaneously servicing write operations to a number that is greater than the number of storage devices that may be lost without resulting in a loss of data.

17. The apparatus of claim 16 further comprising computer program instructions that, when executed by the computer processor, cause the apparatus to carry out the steps of:
   determining that the capacity of the write buffer device no longer exceeds the predetermined capacity threshold; and
   reducing the number of storage devices that may be simultaneously servicing write operations.

18. The apparatus of claim 14 further comprising computer program instructions that, when executed by the computer processor, cause the apparatus to carry out the steps of:
   determining that a storage device comprising a target of a read operation is busy;
   determining a total number of busy storage devices within the failure domain, including the storage device targeted by the read operation; and
   if the total number of busy storage devices within the failure domain is not greater than the number of storage devices that may be lost without resulting in a loss of data, effecting the read operation as a reconstructive read operation utilizing the storage devices that are not busy.

19. A storage system for administering read operations, the storage system comprising a plurality of storage devices, a computer processor and a computer memory, the computer memory including computer program instructions that, when executed by the computer processor, cause the storage system to carry out the steps of:
   limiting a number of storage devices within a failure domain that may be simultaneously servicing write operations to a number less than a number of storage devices that may be lost without resulting in a loss of data;
   dynamically adjusting the number of storage devices within the failure domain that may be simultaneously servicing write operations; and
   determining that a storage device comprising a target of a read operation is busy;
   determining a total number of busy storage devices within the failure domain, including the storage device targeted by the read operation; and
   if the total number of busy storage devices within the failure domain is not greater than the number of storage devices that may be lost without resulting in a loss of data, effecting the read operation as a reconstructive read operation utilizing the storage devices that are not busy.

20. The storage system of claim 19 further comprising computer program instructions that, when executed, carry the storage system to carry out the steps of:
   determining that a storage device comprising a target of a read operation is busy further comprises determining that the storage device targeted by the read operation is effecting a write operation.

* * * * *